(12) United States Patent
Kaniel

(10) Patent No.: US 12,253,177 B2
(45) Date of Patent: Mar. 18, 2025

(54) COAXIAL VALVE SYSTEM

(71) Applicant: Uri Kaniel, Netanya (IL)

(72) Inventor: Uri Kaniel, Netanya (IL)

( * ) Notice: Subject to any disclaimer, the term of this patent is extended or adjusted under 35 U.S.C. 154(b) by 87 days.

(21) Appl. No.: 18/341,586

(22) Filed: Jun. 26, 2023

(65) Prior Publication Data

US 2024/0240718 A1 Jul. 18, 2024

Related U.S. Application Data

(60) Provisional application No. 63/480,203, filed on Jan. 17, 2023.

(51) Int. Cl.
*F16K 31/524* (2006.01)
*F16K 1/44* (2006.01)
*F16K 11/14* (2006.01)

(52) U.S. Cl.
CPC .............. *F16K 1/44* (2013.01); *F16K 11/14* (2013.01); *F16K 31/52416* (2013.01); *F16K 2200/202* (2021.08)

(58) Field of Classification Search
CPC .......... F16K 1/44; F16K 11/14; F16K 11/202; F16K 31/52416; F16K 2200/202; Y10T 137/87121; F01L 1/58–285
See application file for complete search history.

(56) References Cited

U.S. PATENT DOCUMENTS

| | | | |
|---|---|---|---|
| 1,496,278 A | 6/1924 | Heinrich | |
| 1,629,122 A | 5/1927 | Walter | |
| 3,690,768 A | 9/1972 | Nagasawa | |
| 4,449,490 A * | 5/1984 | Hansen | F01L 1/285 123/48 A |
| 5,233,951 A | 8/1993 | Hausknecht | |
| 5,603,291 A | 2/1997 | Al-Kaheli | |
| 6,526,932 B1 * | 3/2003 | Sarhan | F01L 1/285 123/188.4 |
| 11,506,119 B2 | 11/2022 | Alexander et al. | |
| 2002/0179028 A1 | 12/2002 | Sweetland | |
| 2011/0162607 A1 | 7/2011 | Rickenbach et al. | |
| 2012/0048224 A1 * | 3/2012 | Taplin | F02M 27/02 123/1 A |

FOREIGN PATENT DOCUMENTS

| | | | | |
|---|---|---|---|---|
| DE | 410987 C * | 3/1925 | | |
| DE | 9016857 U1 * | 5/1992 | | |
| WO | WO-0225069 A1 * | 3/2002 | | F01L 1/28 |

* cited by examiner

*Primary Examiner* — Marina A Tietjen
(74) *Attorney, Agent, or Firm* — Shlomo Horowitz Patents and Intellectual Property Ltd.

(57) ABSTRACT

An interposed coaxial valve system designed for internal combustion engines. The system comprises a single main valve integrating two coaxial valves: an interior valve and an exterior valve. The interior valve may move independently from the exterior valve during engine operation. The system minimizes spatial occupancy for internal combustion engine valves. By interposing the interior valve within the exterior valve, the system achieves a compact and efficient design. The system may also comprise adjacent intake and exhaust ports to promote heat transfer between the two ports.

19 Claims, 31 Drawing Sheets

COAXIAL VALVE SYSTEM

FIELD OF THE INVENTION

The present invention relates generally to an engine valve. More specifically, the present invention relates to a coaxial valve system for internal combustion engines and machines that require valves.

BACKGROUND OF THE INVENTION

Engine valves are devices that are used in internal combustion engines that allow or prevent the flow of a gas or fluid from the combustion chambers of an engine during operation. A single combustion chamber for a four-stroke engine requires two valves that control the flow of a fluid or gas to and from the engine. Typically, the valves open and close in a linear path by means of a rotating cam as the cycle of the engine occurs. The two valves are referred to as an intake valve and an exhaust valve. The intake valve, also commonly referred to as an inlet valve, controls the fluid, gas, or fuel that enters into the combustion chamber from the intake port. The exhaust valve is the valve that allows the spent air-fuel mixture to escape from the combustion engine through the exhaust port. In a four-stroke engine, there are four strokes of the piston, meaning that the piston head travels the length of the cylinder four times, in order to complete the cycle. The cycle has four strokes including an intake stroke, a compression stroke, a combustion stroke, and an exhaust stroke. The intake stroke occurs while the exhaust valve is closed and the intake valve is open, allowing for air and fuel to enter into the combustion chamber as the piston moves down the cylinder, increasing the volume of the combustion chamber. Following the intake stroke, the compression stroke is the stroke in which the intake valve closes, sealing the combustion chamber, and the piston compresses the air-fuel mixture as the piston moves up the cylinder reducing the volume of the combustion chamber. Next, in the combustion stroke, the air-fuel mixture is ignited by means of a spark plug, as in a gasoline engine, or by the heat generated by compression, as in diesel engines, forcing the piston back down the cylinder. Lastly, the final stroke of the cycle is the exhaust stroke, in which the exhaust valve opens and the piston decreases the volume within the combustion chamber, expelling the spent air-fuel mixture from the system. The prior art discloses that in internal combustion engines, there must be two distinct engine valves that are typically diametrically opposed to each other on the cylinder head, thus leading to two distinct ports as well. Because there are two distinctly different valves and two distinctly different ports, internal combustion engine systems have a limit to the space that they may be compacted. Also, it has been found that during the cycle of the internal combustion engines, the exhaust port may reach temperatures that may compromise the structural integrity of the surrounding components of the engine. Furthermore, when examining internal combustion engines, it is known that lower ambient temperatures may impact the performance of the engine, especially upon startup.

An objective of the present invention is to provide a system which utilizes coaxial valves for internal combustion engines and machines that utilize at least one valve such as compressors, pumps, and the like. The present invention reduces the amount of space taken up by traditional engine valve systems by providing a single coaxial valve system in place of the two distinct valve system as taught by the prior art. By having two concentric valves, one interposed, or housed, within the other, the present invention provides for a compacted system with better valve control and timing. An additional objective of the invention is to provide a concentric valve system that cools the exhaust valve and exhaust port of an internal combustion engine system. Furthermore, the present invention provides an improved design for internal combustion engines, especially diesel engines, that allows for increased fuel efficiency and an improvement of engine startups in environments with ambient temperatures lower than what is ideal for traditional internal combustion engine startups, as taught by the prior art. Additionally, the present invention may be utilized in a hydrogen engine as well. Unlike the prior art, where the exhaust valve absorbs the heat of the spent fuel, the exhaust valve of the present invention is cooled by intake air, thus preventing overheating of the system. Additionally, the present invention allows for easier manufacturing of components as computer numerical control machines (CNC machines) may be used in the manufacturing process.

Furthermore, the valve system may be adapted for uses outside of that of an internal combustion engine. Such uses may extend to industries such as but not limited to agriculture, biofuel, construction, food and beverage processing, mining, nuclear power, oil and gas, pharmaceuticals and medical industries, and water and wastewater treatment.

SUMMARY OF THE INVENTION

The present invention provides a coaxial valve system with a plurality of coaxial interposed valves. The present invention may be used in internal combustion engines, pumps, compressors, and any other machine that requires valves.

DETAIL DESCRIPTIONS OF THE INVENTION

Figure 1:
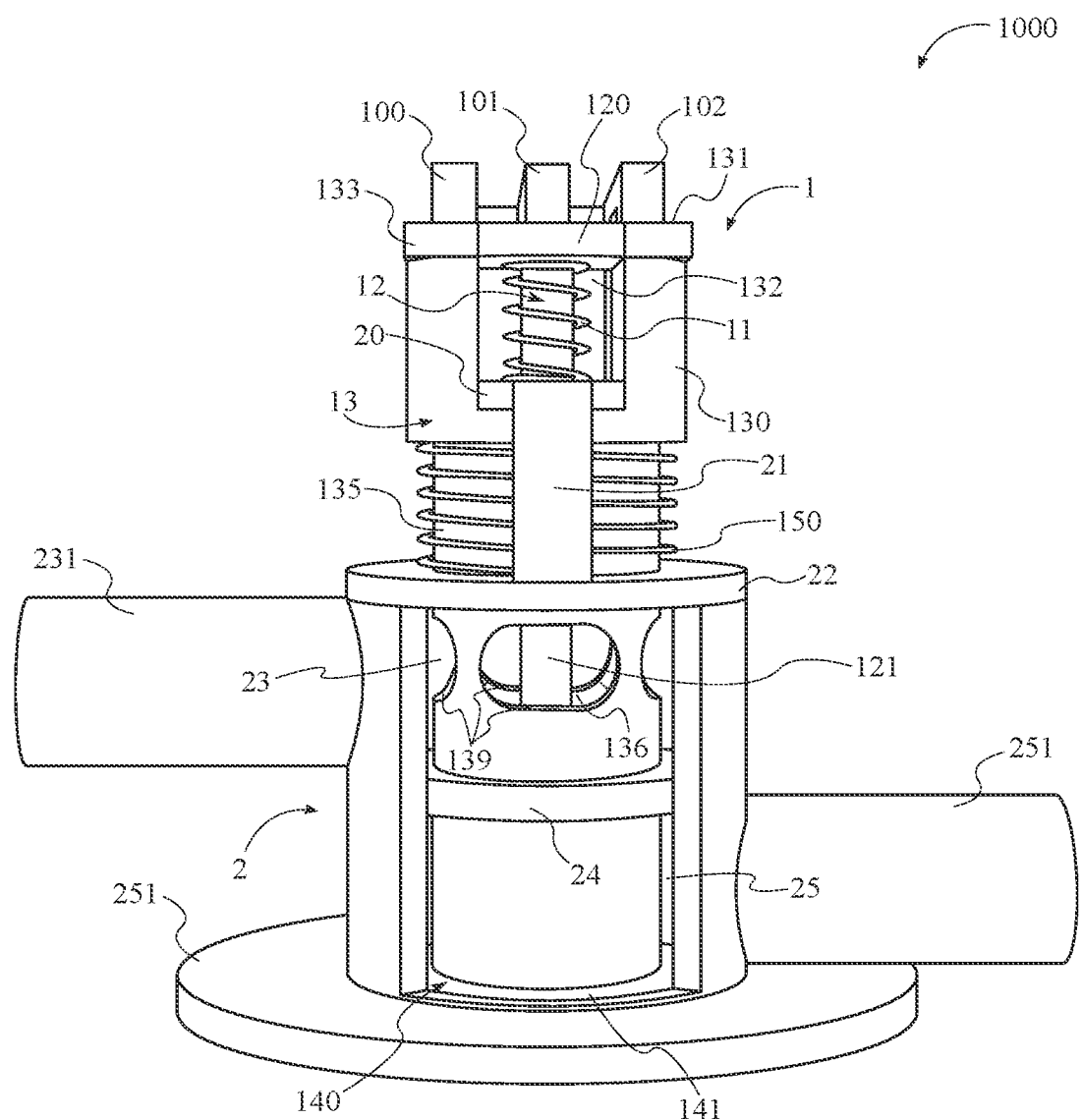
FIG. 1 is a perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

In the case of the present invention, the term "coaxial" is defined as two or more forms sharing a common axis. More specifically, in the case of the present invention, the present invention comprises two valves, both comprising a cylindrical shape, and thus the valves both have an imaginary straight line that runs through the center of the cross-sectional area of the valve, wherein said line is referred to and understood by those in the art, as an axis. In the present invention, the term coaxial refers to the imaginary axes of the two valves having alignment and it is well understood by those in the art.

Further, as is the case in the present invention, the term "interposed" is defined as two distinct objects, one of the objects existing within the other object. In the present invention, there are two valves, one valve is interposed in the other valve.

Moreover, within the present invention, reference has been made to "intake" and "exhaust" components. Within the application, these have remained consistent throughout as the intake components refer to the components that facilitate the entering of a fluid, whereas exhaust refers to the components that facilitate the existing of fluids. Although these have been described and referred to herein in a particular arrangement, it is understood to those in the art, and thus should not be limited to, in practice and by scope of the protection afforded by any granted rights, that the arrangement of "intake" and "exhaust" components are strictly arranged in the same manner. Rather, "intake" and "exhaust," as used herein, are merely placeholders to identify differing components, and thus in practice the "intake" component of the application may be used within an exhaust process of an internal combustion engine, and vice versa.

The present disclosure includes many aspects and features. Moreover, while many aspects and features relate to, and are described in the context of a coaxial valve system 1000, embodiments of the present disclosure are not limited to use only in this context.

More specifically, the present invention pertains to a coaxial valve system 1000 for the purpose of internal combustion engines and the like. It is known and understood within the prior art that an internal combustion engine is a power-generating mechanism that operates through the combustion of fuel inside its cylinders. There are two commonly used types: the four-stroke engine and the diesel engine. In a four-stroke engine, there are four unique strokes including an intake stroke, a compression stroke, a power stroke, and an exhaust stroke. First, during the intake stroke, a piston descends, creating a vacuum that opens an intake valve and allows a fuel-air mixture to enter a cylinder. Second, in the compression stroke, the piston ascends, compressing the fuel-air mixture while keeping both the intake valve and an exhaust valve closed. Third, at the top of the compression stroke, a spark plug ignites the highly compressed fuel-air mixture, leading to controlled combustion. This combustion causes rapid gas expansion, forcefully driving the piston downward and generating power in the power stroke. Finally, in the exhaust stroke, the piston ascends again while the exhaust valve opens, enabling the expulsion of the burned gases as the piston reaches the top, preparing for the subsequent intake stroke.

In the case of a diesel engine, the process shares similarities with the four-stroke engine but with distinct differences. During the intake stroke, only air is drawn into the cylinder, with fuel injection occurring at a later stage. The compression stroke follows, during which the highly compressed air heats up significantly. As the piston nears the top of the compression stroke, fuel is directly injected into the hot, compressed air. The fuel self-ignites due to the high compression heat, eliminating the need for a spark plug. This leads to combustion, propelling the piston downward and generating power in the power stroke. Subsequently, in the exhaust stroke, the burned gases are expelled from the cylinder as the piston ascends.

The present invention provides a coaxial valve system 1000 comprises a main valve 1 comprising a plurality of interposed valves. As shown in FIG. 1, in the preferred embodiment of the invention, the main valve 1 of the coaxial valve system 1000 comprises an interior valve 12 and an exterior valve 13 which are coaxially interposed with the exterior valve 13 housing the interior valve 12. Furthermore, in the preferred embodiment of the invention, the exterior valve 13 is used as the exhaust valve whereas the interior valve 12 is used as the intake valve. The interior valve 12 comprises a top plate 120, a rod 121, and a bottom plate 123 comprising a bevel 124. The rod 121 of the interior valve 12 comprises a first end and a second end wherein said ends are opposite each other; the top plate 120 of the interior valve 12 located at one end of the rod 121 and the bottom plate 123 of the interior valve 12 being located at the opposite end of the rod 121. The bottom plate 123 of the interior valve 12 comprises the bevel 124 wherein said bevel 124 is an angled surface.

The exterior valve 13 comprises an upper portion 130, a center portion 135, a lower portion 140, and a through hole 134. The upper portion 130 of the exterior valve 13 is adjacent to the center portion 135 of the exterior valve 13. The center portion 135 of the exterior valve 13 is adjacent to the lower portion 140 of the exterior valve 13, wherein the lower portion 140 is at an end of the center portion 135 opposite an end of the center portion 135 of the exterior valve 13 wherein the upper portion 130 is located. The upper portion 130 of the exterior valve 13 comprises a cutout 132, an upper face 131, and a lip 133. The cutout 132 of the upper portion 130 is a section of the upper portion 130 that has been removed to allow the movement of the interior valve 12, thus constraining the movement of the interior valve 12 to lateral movement which is perpendicular to the upper face 131 of the upper portion 130, unidirectional to the imaginary centered axis of the rod 121 of the interior valve 12. The upper face 131 of the upper portion 130 of the exterior valve 13 is the topmost surface of the exterior valve 13, comprising two coplanar sections, separated by the cutout 132. The lip 133 of the exterior valve 13 is a protruded edge proximate the top of the upper portion 130 of the exterior valve 13. The center portion 135 of the exterior valve 13 comprises a duct 136, a plurality of openings 139, and an interior valve guide rail comprising a plurality of bore holes 138. The interior guide rail is located within the duct 136. The plurality of bore holes 138 of the interior valve guide rail may comprise a plurality of conical shaped bore holes, a plurality of cylindrical shaped bore holes, and a plurality of other geometrically shaped bore holes. The plurality of bore holes 138 is to allow for fluid flow throughout the duct 136 of the center portion 135 of the exterior valve 13 to the lower portion 140 of the exterior valve 13. The lower portion 140 of the exterior valve 13 comprises a top face 141, an inner diameter bevel 145, an outer diameter bevel 142, a bottom face 143, and a recess cavity 201. In the preferred embodiment of the present invention, the various portions of the exterior valve 13; the upper portion 130, the center portion 135, and the lower portion 140; are defined and distinguished by the difference in outer diameters of each portion.

Figure 2:
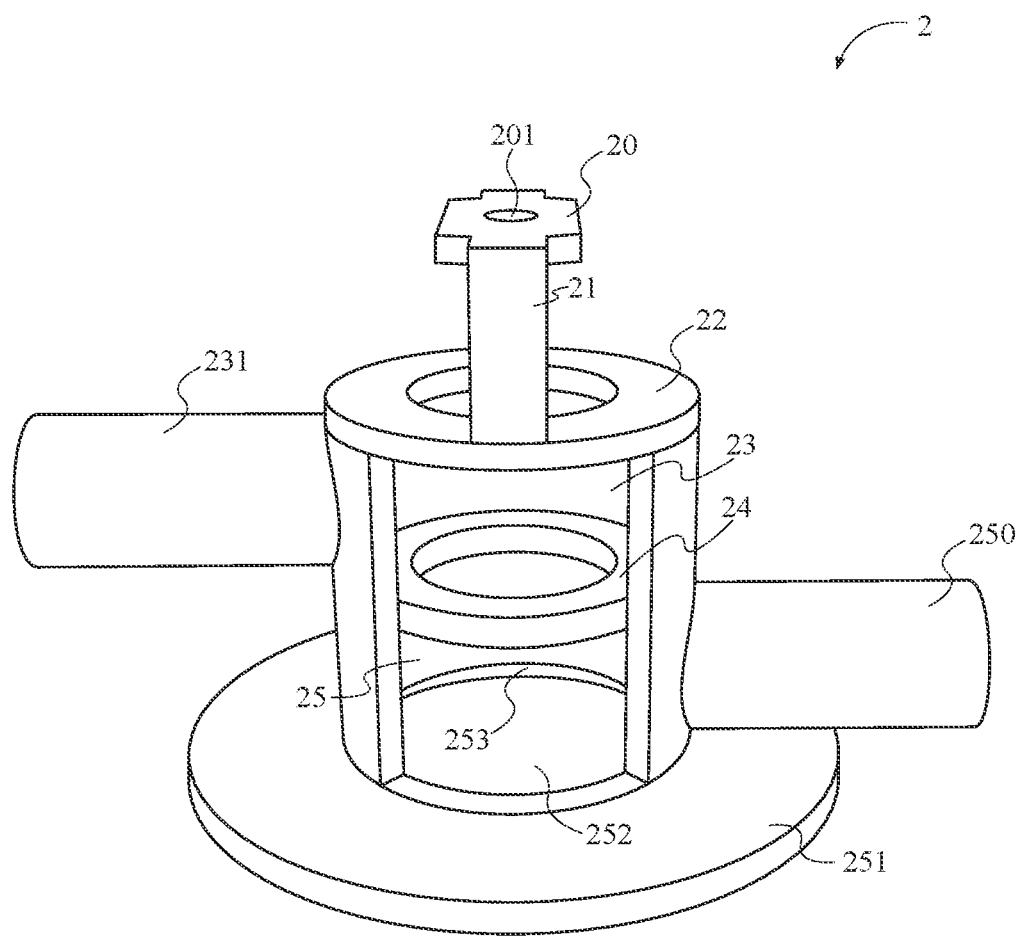
FIG. 2 is a component view of the housing of the present invention.
Figure 3:
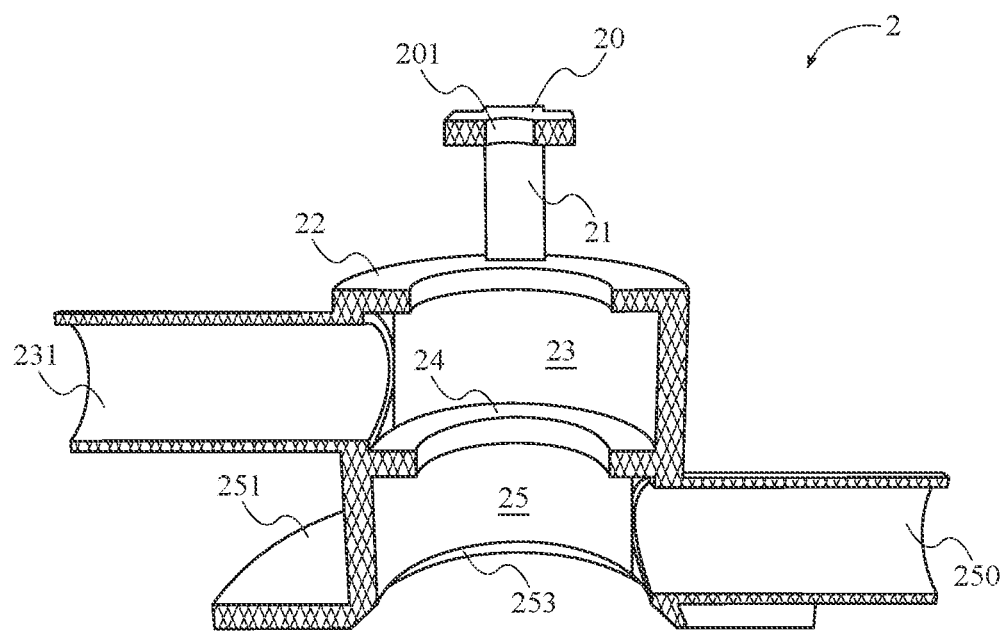
FIG. 3 is a sectional view of the housing on the present invention.

Additionally, as shown in FIG. 1, the coaxial valve system 1000 further comprises a housing 2 in which the plurality of interposed valves is contained. In the preferred embodiment of the present invention, the housing 2, as shown in FIG. 2 and FIG. 3, comprises an interior valve platform 20, a plurality of vertical supports 21, a central horizontal plate 22, an exterior valve guide rail 24, and a plurality of internal chambers. The vertical supports 21 are adjacent to both the interior valve platform 20 and the central horizontal plate 22. The interior valve platform 20 is elevated above the central horizontal plate 22, rigidly secured by the plurality of vertical supports 21. In the preferred embodiment of the present invention the interior valve platform 20 comprises a through hole allowing for the rod 121 of the interior valve 12 to pass through the interior valve platform 20. In one embodiment of the present invention, the exterior of the housing 2 may further comprise fins. In the embodiment comprising fins, heat may transfer differently than in alternative embodiments.

Figure 4:
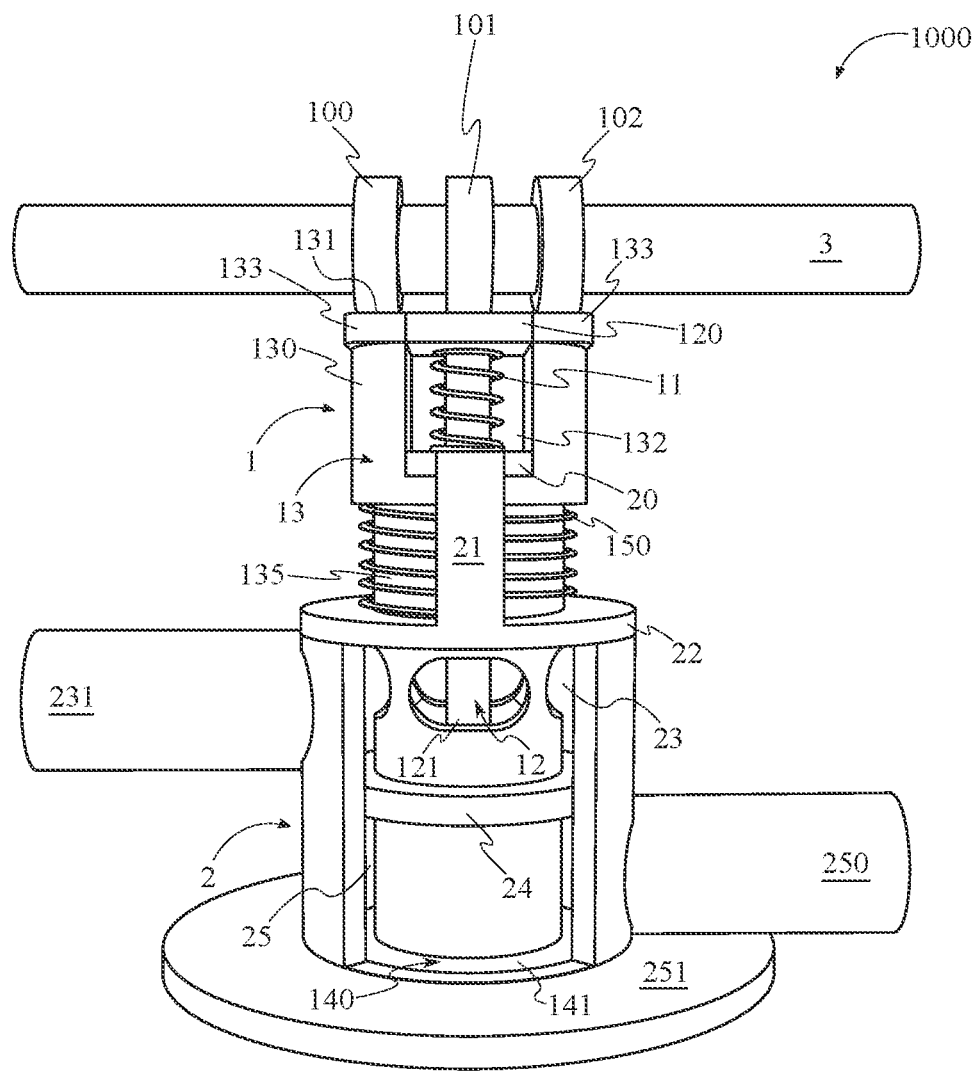
FIG. 4 is a front elevated view thereof.

Furthermore, as shown in FIG. 4, in some embodiments of the present invention, the coaxial valve system 1000 further comprises a camshaft 3, a plurality of cams 10, an interior valve spring 11, and an exterior valve spring 150. The plurality of cams 10, in the preferred embodiment of the present invention, are coupled to the camshaft 3 of the system wherein said plurality of cams 10 comprises a first cam 100, a second cam 101, and a third cam 102. The first cam 100 is adjacent to the second cam 101, the second cam 101 is adjacent to the third cam 102. The interior valve spring 11 is interposed between the bottommost surface of the top plate 120 of the interior valve 12 and the topmost surface of the interior valve platform 20 of the housing 2. The exterior valve spring 150 is interposed between the upper portion 130 of the exterior valve 13 and the central horizontal plate 22 of the housing 2. The plurality of internal chambers, separated by the exterior valve guide rail 24, comprises an intake chamber 23, an exhaust chamber 25, an intake port 231, and an exhaust port 250. The intake port 231 intersects the intake chamber 23. The exhaust port 250 intersects the exhaust chamber 25. The intake port 231 and the exhaust port 250 provide a passage for a fluid, a gas, or a combination of fluid and gas, to pass through the system. In the preferred embodiment of the present invention, the intake port 231 is diametrically opposed to the exhaust port 250 proximate the diameter of the housing 2. The intake port 231 and the exhaust port 250 are merely naming conventions and may be used interchangeably.

Figure 5:
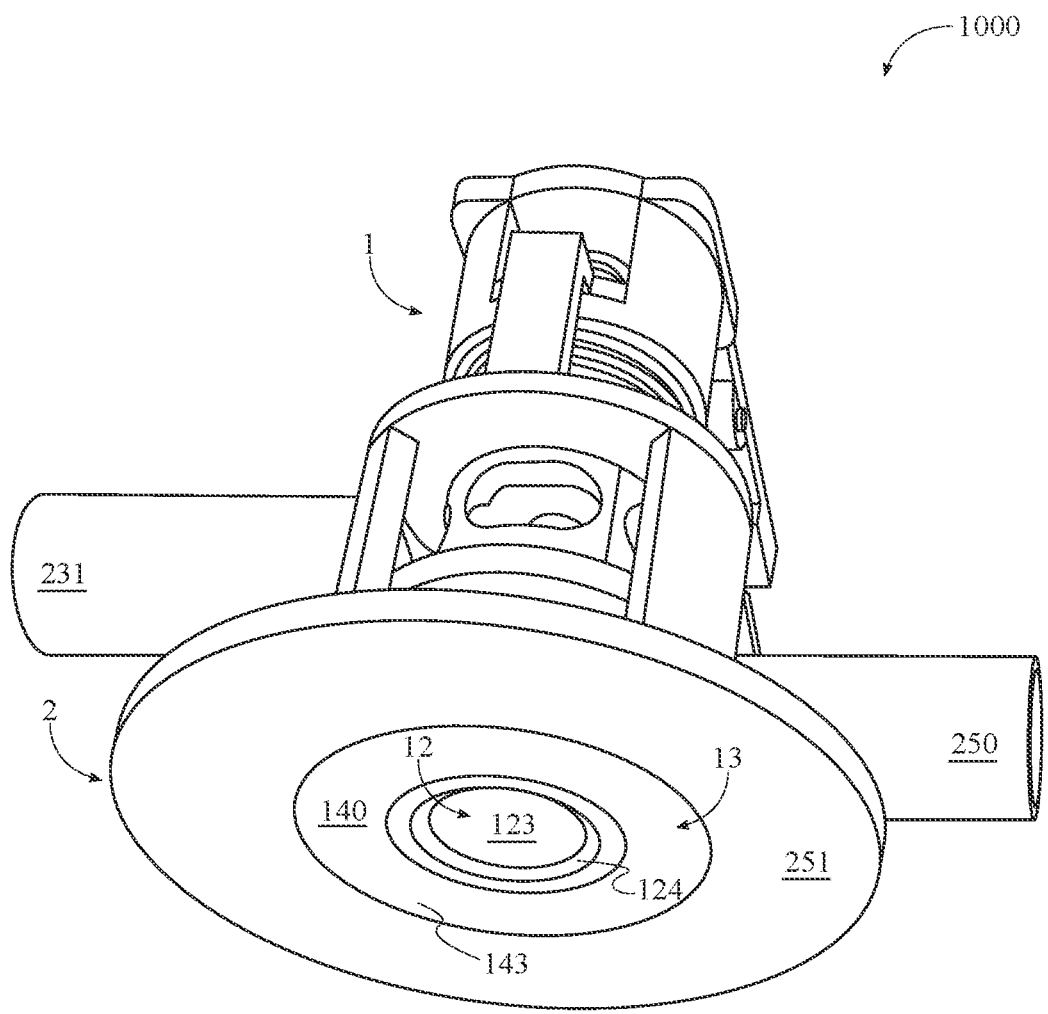
FIG. 5 is a bottom perspective view thereof.

As shown in FIG. 5, the housing 2 further comprises a bottom plate 251. In the preferred embodiment of the present invention, the bottom plate 251 of the housing 2 may exist as the cylinder head of the engine or machine in which the valves are being used in. Furthermore, as shown in by the bottom plate 123 of the interior valve 12 and the bottom face 143 of the lower portion 140 of the exterior valve 13 as seen FIG. 6, the interior valve 12 and the exterior valve 13 are coaxially aligned.

Figure 6:
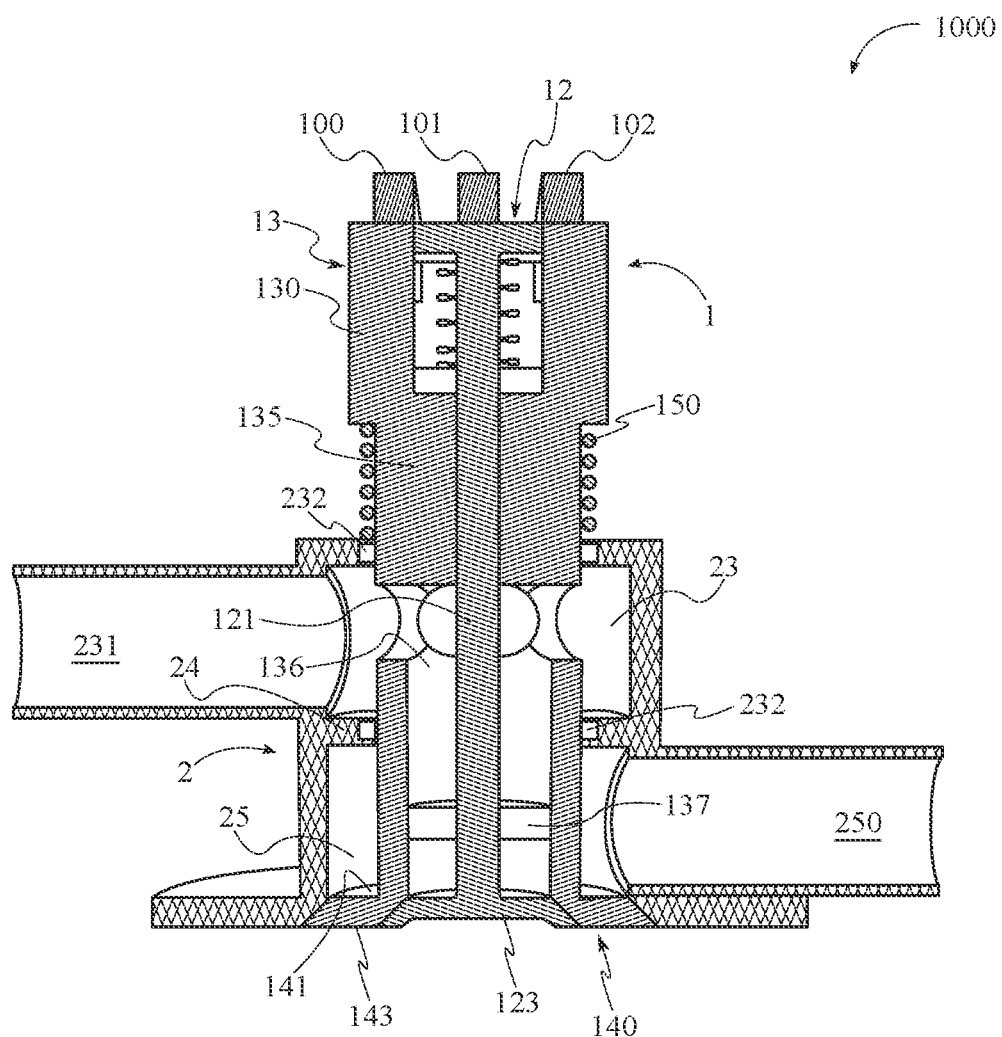
FIG. 6 is a sectional view thereof.

As shown in FIG. 6, the bottom plate 251 of the housing 2 comprises a recess and a beveled edge 253. The beveled edge 253 of the housing 2 creates an angled surface around the perimeter of the recess of the housing 2. In the preferred embodiment of the present invention, the coaxial valve system 1000 will comprise three configurations including an intake configuration, an exhaust configuration, and a closed configuration. When the coaxial valve system 1000 is in the closed configuration, the bevel 124 of the bottom plate 123 of the interior valve 12 engages with the inner diameter bevel 145 of the lower portion 140 of the exterior valve 13, thus sealing the recess cavity 201. Additionally, while in the closed position, the outer diameter bevel 142 of the lower portion 140 of the exterior valve 13 engages with the beveled edge 253 of the housing 2, thus sealing the recess 252 of the housing 2. When the present invention is in the intake configuration, the outer diameter bevel 142 of the lower portion 140 of the exterior valve 13 engages with the beveled edge 253 of the housing 2, while the interior valve 12 is lowered thus exposing the recess cavity 201 of the lower portion 140 of the exterior valve 13. While the present invention is in the exhaust configuration, the bevel 124 of the bottom plate 123 of the interior valve 12 engages with the inner diameter bevel 145 of the lower portion 140 of the exterior valve 13, thus sealing the recess cavity 201 of the lower portion 140 of the exterior valve 13 while both the interior valve 12 and exterior valve 13 are lowered the same distance simultaneously, thus exposing the recess 252 of the housing 2 and the beveled edge 253 of the housing 2.

In alternate embodiments of the present invention, the coaxial valve system 1000 may comprise an at least one seal ring 232. The at least one seal ring 232 is concentric around the outer diameter of the exterior valve 13 as shown in FIG. 6. The at least one seal ring 232 is intended to prevent the leakage of the fluid, the gas, or the combination of fluid and gas at points where components interact.

Figure 7:
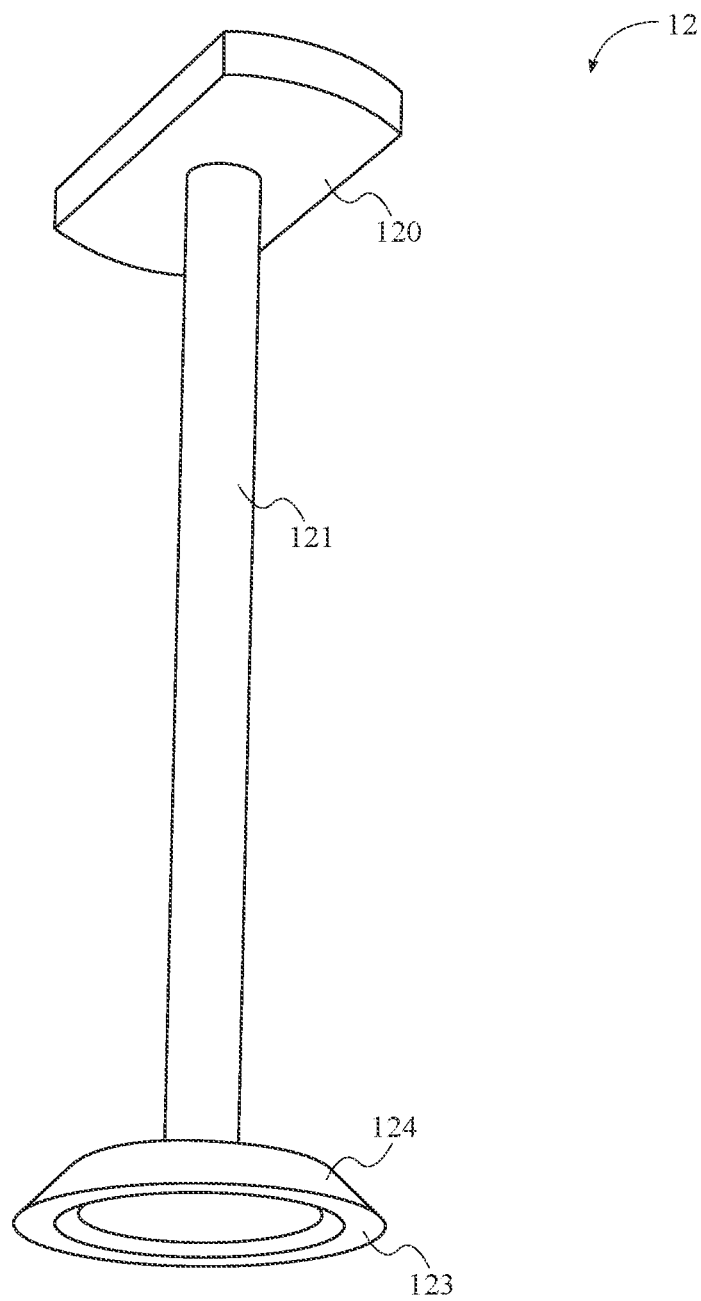
FIG. 7 is a component view of the interior valve of the present invention.

As shown in FIG. 7, the interior valve 12 comprises the top plate 120, the rod 121, and the bottom plate 123 comprising the bevel 124. The top plate 120 is adjacent to the rod 121. The rod 121 is adjacent to the bottom plate 123. The bottom plate 123 comprises the bevel 124 of the bottom plate 123 of the interior valve 12.

Figure 8:
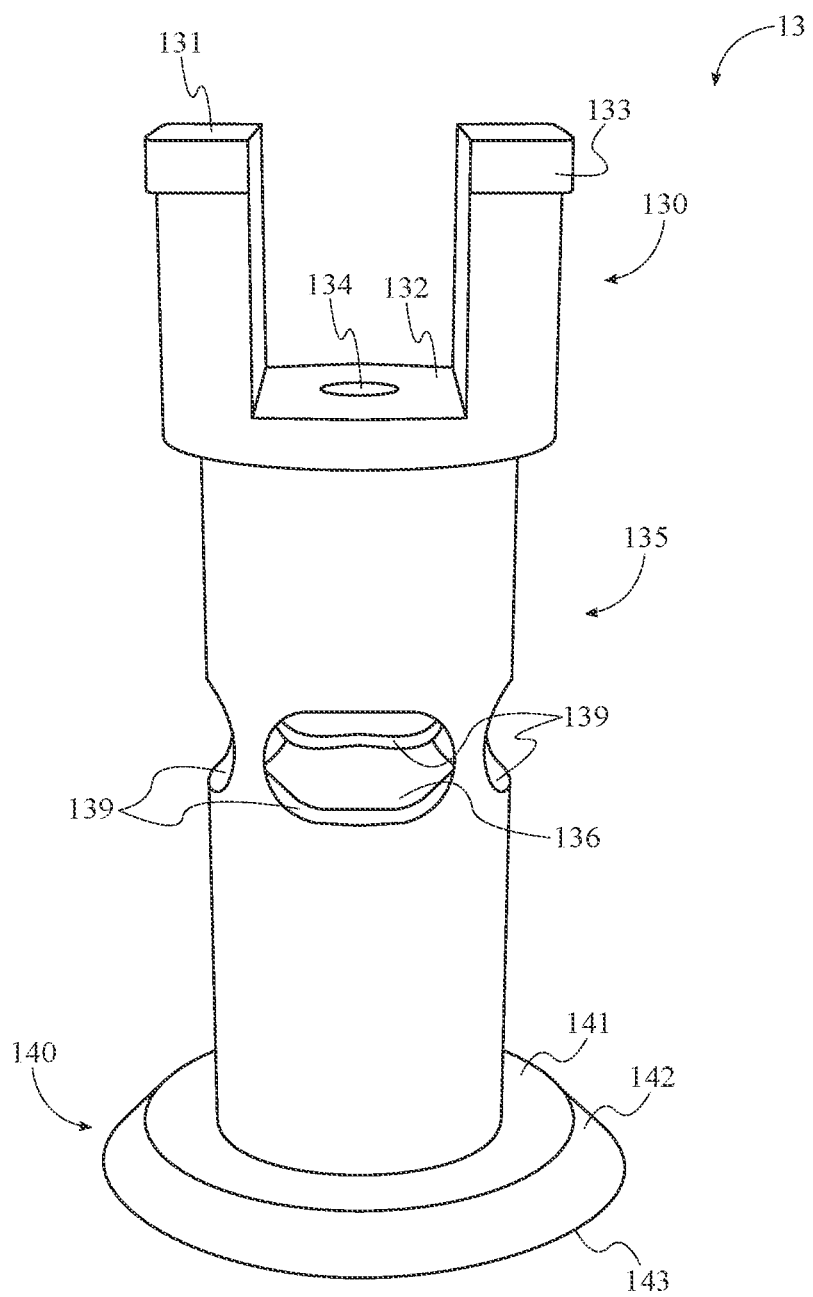
FIG. 8 is a component view of the exterior valve of the present invention.

As shown in FIG. 8, the exterior valve 13 comprises the upper portion 130, the center portion 135, and the lower portion 140. The upper portion 130 comprises the lip 133 and the cutout 132. The through hole 134 of the exterior valve 13 descends though the upper portion 130 of the exterior valve 13 through the top half of the center portion 135 of the exterior valve 13. The upper portion 130 is adjacent to the center portion 135. In the preferred embodiment of the present invention, the upper portion 130 has a greater outer diameter than the outer diameter of the center portion 135 of the exterior valve 13. The center portion 135 is adjacent to the lower portion 140. The lower portion 140 of the exterior valve 13 comprises the top face 141 of the lower portion 140 of the exterior valve 13, the outer diameter bevel 142 of the lower portion 140 of the exterior valve 13, the bottom face 143 of the lower portion 140 of the exterior valve 13, the recess cavity 201, and the inner diameter bevel 145 of the lower portion 140 of the exterior valve 13. In the preferred embodiment of the present invention, the diameter along the edge of the top face 141 of the lower portion 140 of the exterior valve 13 is greater than the diameter of the center portion 135 of the exterior valve 13. In the preferred embodiment of the present invention, the diameter along the edge of the bottom face 143 of the lower portion 140 of the exterior valve 13 is greater than the diameter along the edge of the top face 141 of the lower portion 140 of the exterior valve 13. The top face 141 of the lower portion 140 of the exterior valve 13 is adjacent to the outer diameter bevel 142. The outer diameter bevel 142 of the lower portion 140 of the exterior valve 13 is adjacent to the bottom face 143 of the lower portion 140 of the exterior valve 13.

Figure 9:
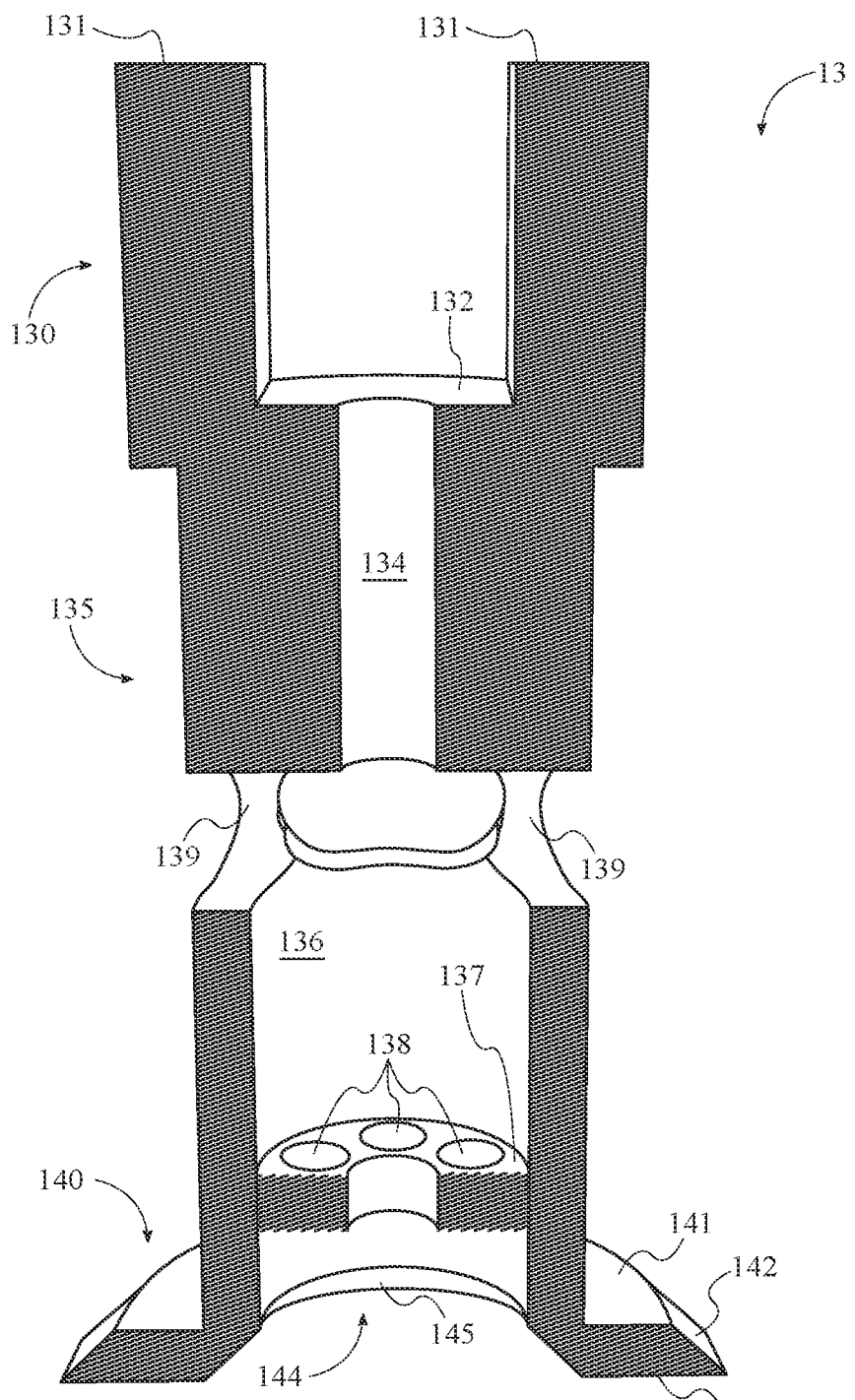
FIG. 9 is a sectional view of the exterior valve of the present invention.
Figure 10:
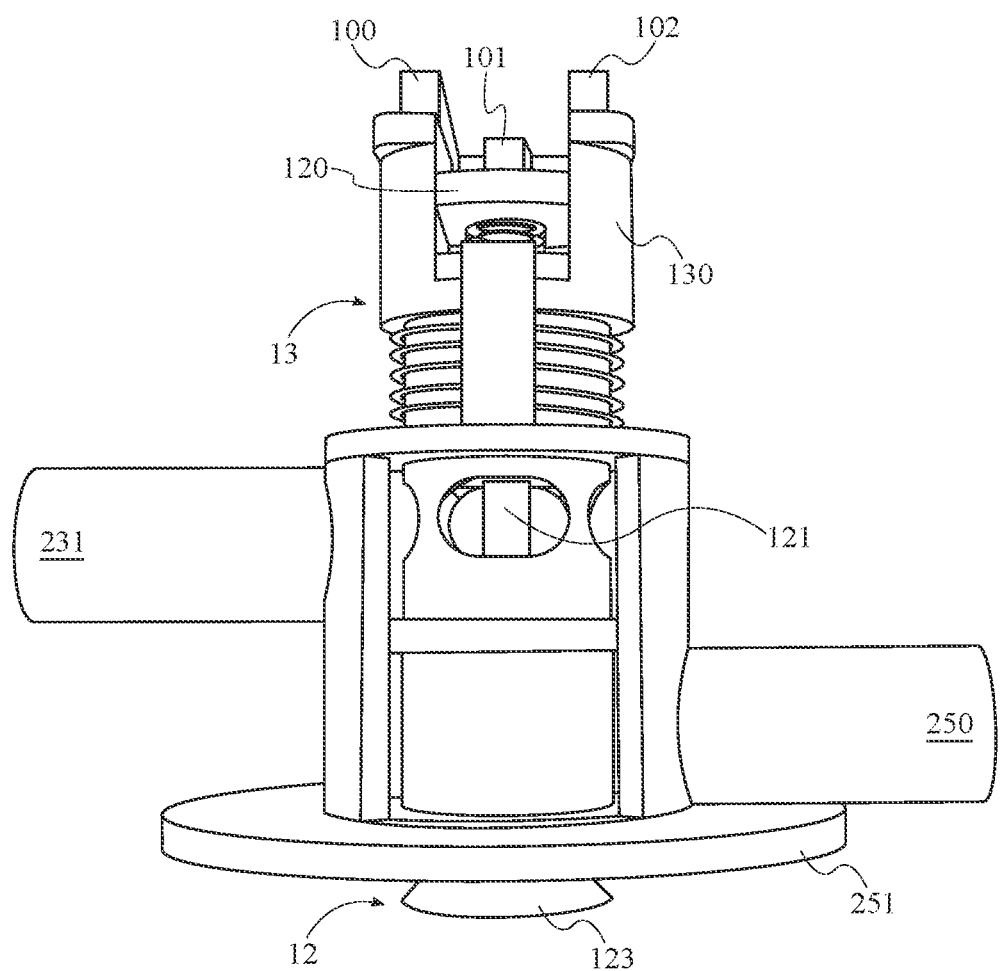
FIG. 10 is an alternative front view of the present invention with the interior valve is in the open configuration.
Figure 11:
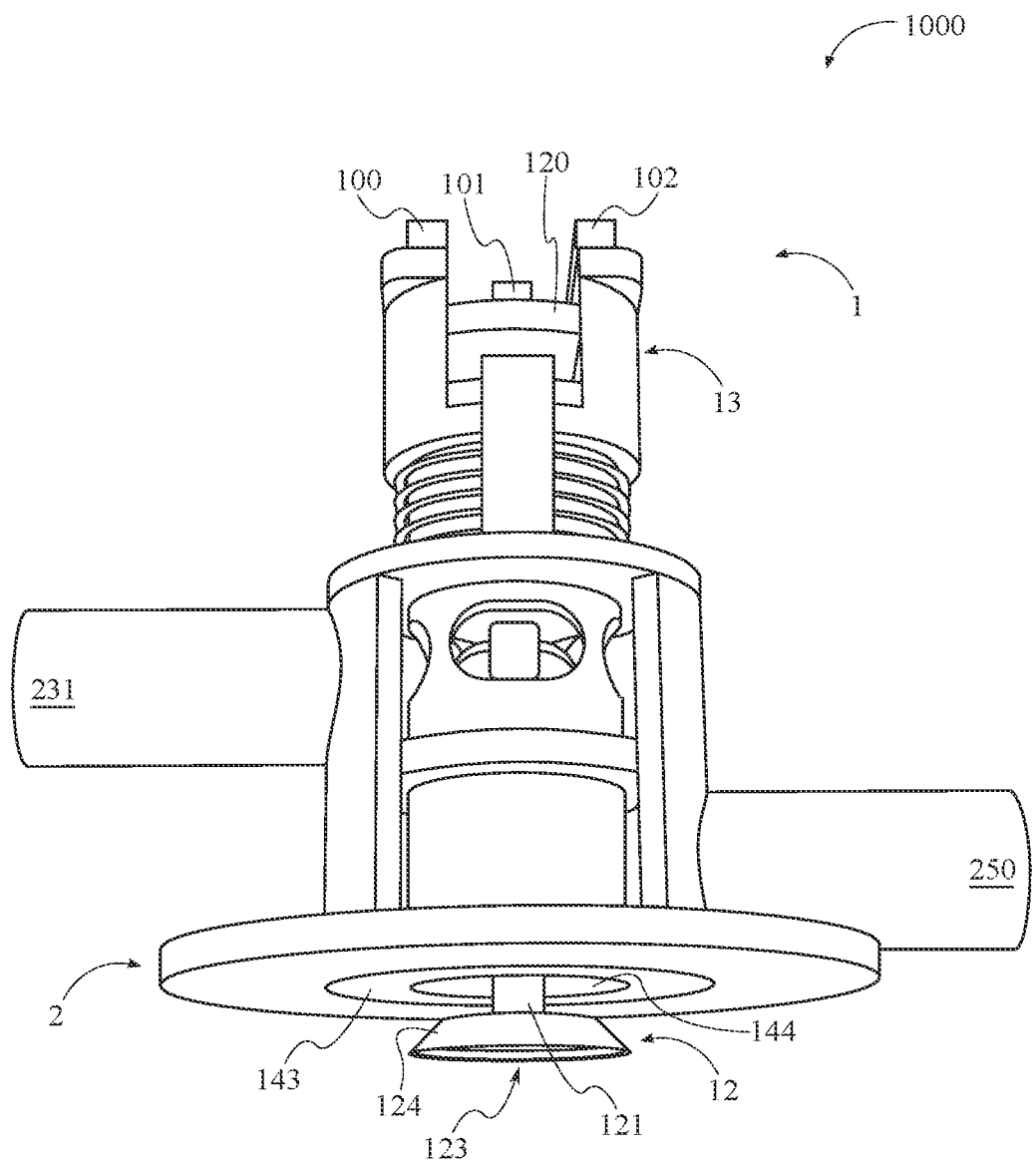
FIG. 11 is a front-bottom view of the present invention with the interior valve in the open configuration.
Figure 12:
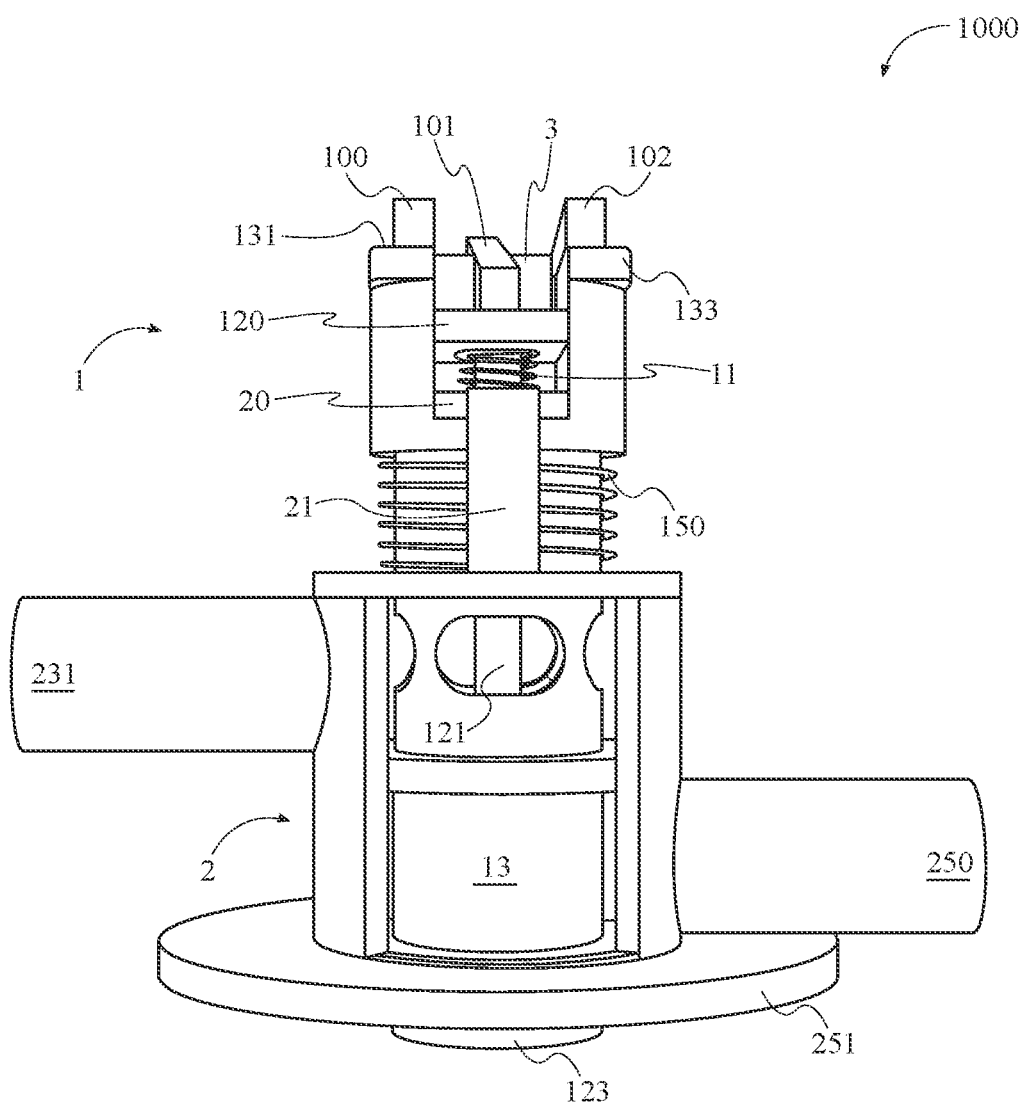
FIG. 12 is a front view of the present invention with the interior valve in an open configuration.
Figure 13:
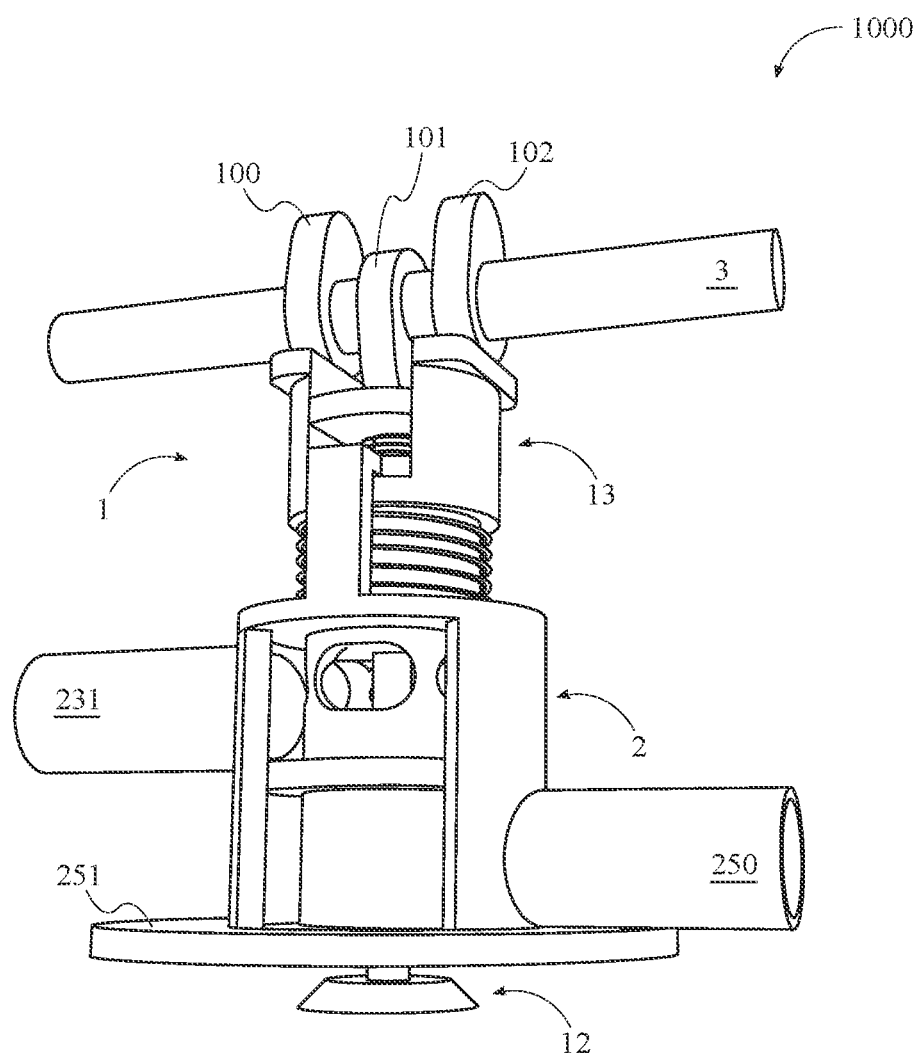
FIG. 13 is an alternative perspective view of the present invention with the interior valve in the open configuration.

As shown in FIG. 9, the through hole 134 of the exterior valve 13 extends through the cutout 132 of the upper portion 130 and the center portion 135 of the exterior valve 13 including through the center of the internal valve guide rail 137. When assembled, the valve of the internal valve is capable of moving linearly within the through hole 134 of the exterior valve 13. Furthermore, as shown in FIG. 9, the internal valve guide rail 137 comprises a plurality of bore holes 138.

As shown in FIG. 10, FIG. 11, FIG. 12, and FIG. 13, the interior valve 12 of the present invention, is capable of moving exclusive on the exterior valve 13, especially when the internal valve is in an open configuration. The interior valve 12 and the exterior valve 13 are able to move linearly within the exterior valve 13 and the housing 2, respectively. In the preferred embodiment of the present invention, when the second cam 101 applies a downward force to the interior valve 12, the interior valve spring 11 compresses and the bottom plate 123 of the interior valve 12 is forced downward such that the bottommost face of the bottom plate 123 of the interior valve 12 extends past the bottom face 143 of the lower portion 140 of the exterior valve 13, thus exposing a passageway into the duct 136 of the exterior valve 13.

Figure 14:
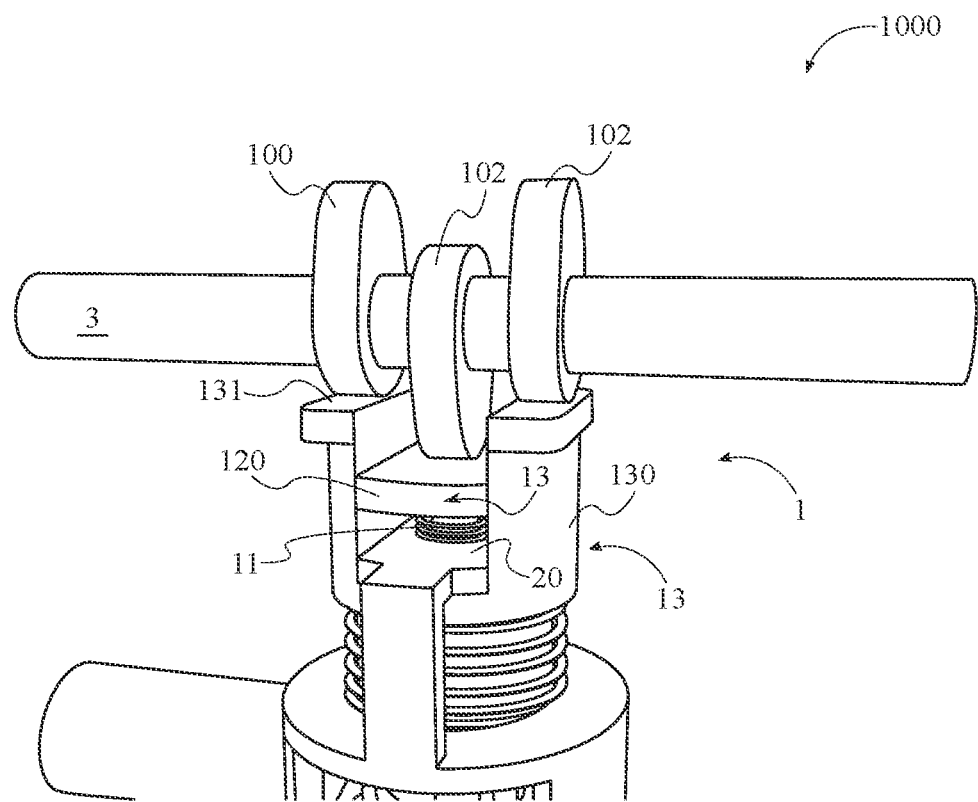
FIG. 14 is a detailed view of the present invention with the interior valve in the open configuration.

As shown in FIG. 14, the plurality of interposed valves are driven up and down, linearly, by the plurality of cams 10. In the preferred embodiment of the present invention, the plurality of cams 10 comprises cam shapes that are oblong or non-concentrically rotated disks. Additionally, in the preferred embodiment of the present invention, the plurality of cams 10 rotate as they are connected to a single camshaft 3. As the camshaft 3 rotates, the cams will drive the plurality of interposed valves upwards and downwards in a linear path. In additional embodiments of the present invention, the valves may be driven by way of an electric motor or electronic solenoid actuator.

Figure 15:
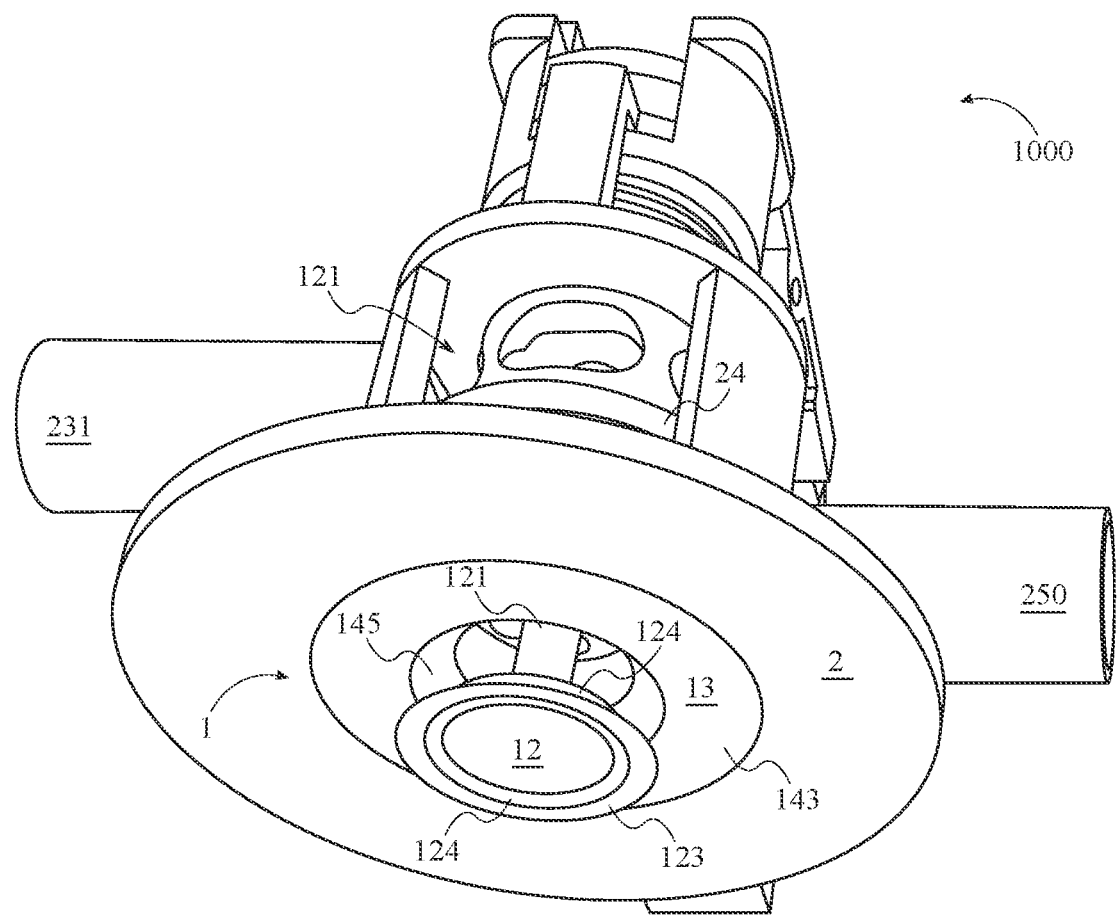
FIG. 15 is bottom perspective view of the present invention with the interior valve in the open configuration.
Figure 16:
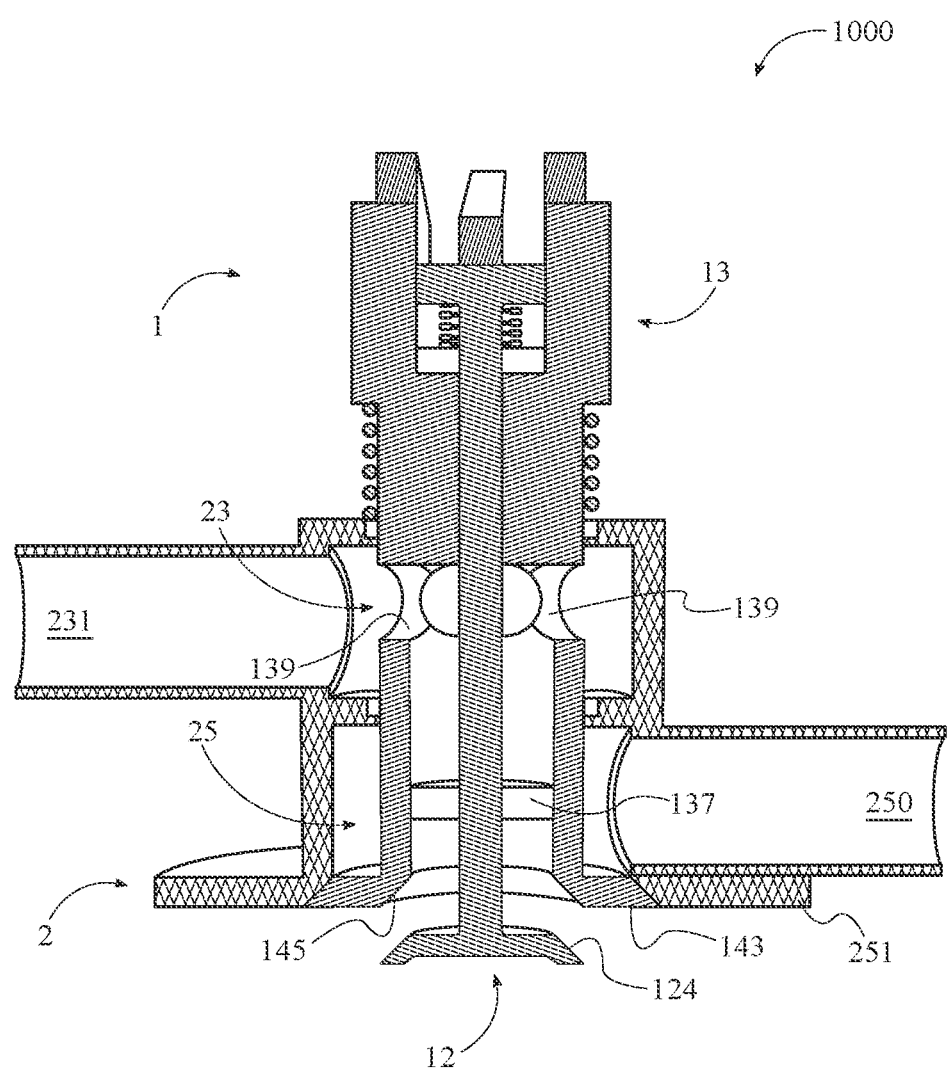
FIG. 16 is a sectional view of the present invention with the interior valve in the open configuration.
Figure 17:
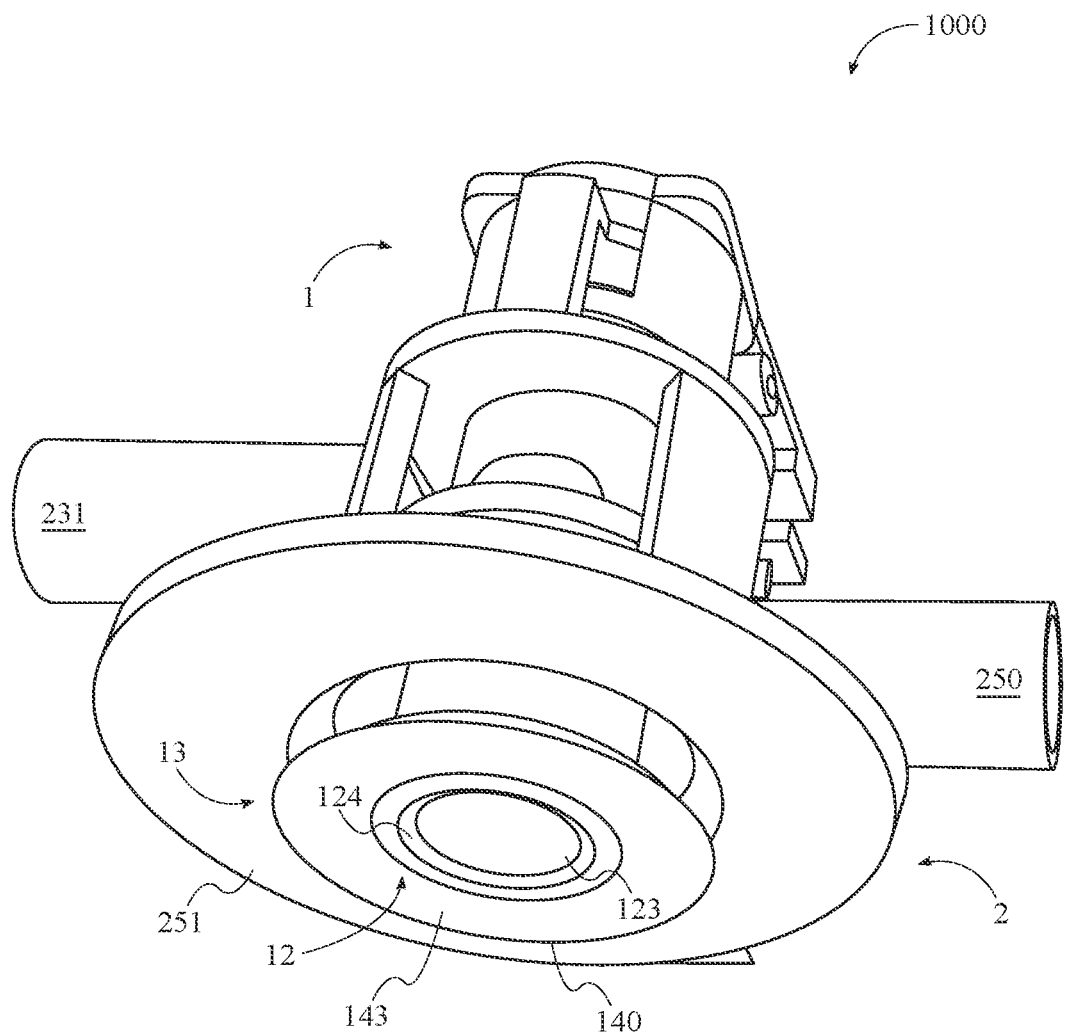
FIG. 17 is a bottom perspective view of the present invention with the exterior valve in an open configuration.

As shown in FIG. 15, FIG. 16, and FIG. 17, when in the intake configuration, the outer diameter bevel 142 of the lower portion 140 of the exterior valve 13 engages with the beveled edge 253 of the housing 2, while the interior valve 12 is lowered thus exposing the recess cavity 201 of the lower portion 140 of the exterior valve 13. In the preferred embodiment of the present invention, the fluid, the gas, or the combination of fluid and gas, will travel through the intake port 231 into the intake chamber 23, through the plurality of openings 139 in the center portion 135 of the exterior valve 13, down through the bore holes in the internal valve guide rail 137, and then exit through the recess cavity 201 of the lower portion 140 of the exterior valve 13 when the interior valve 12 lowers into the intake configuration. The names for the intake port 231 and the exhaust port 250 are merely naming conventions and may be used interchangeably.

Figure 18:
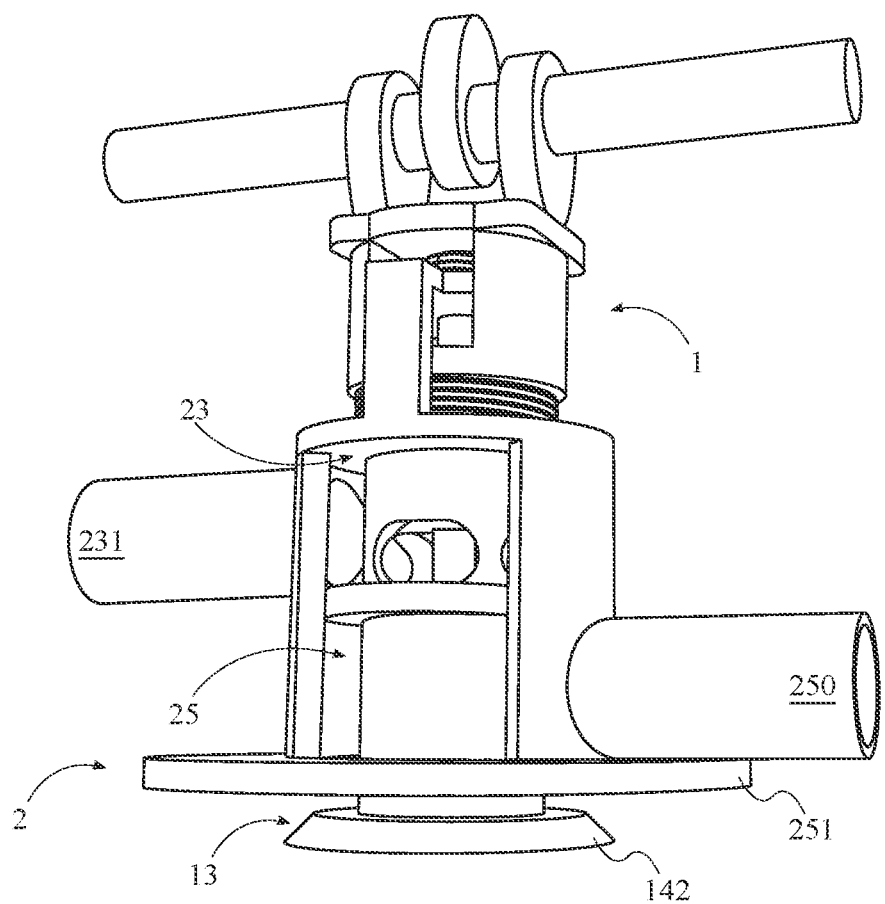
FIG. 18 is a front-right perspective view of the present invention with the exterior valve in the open configuration.
Figure 19:
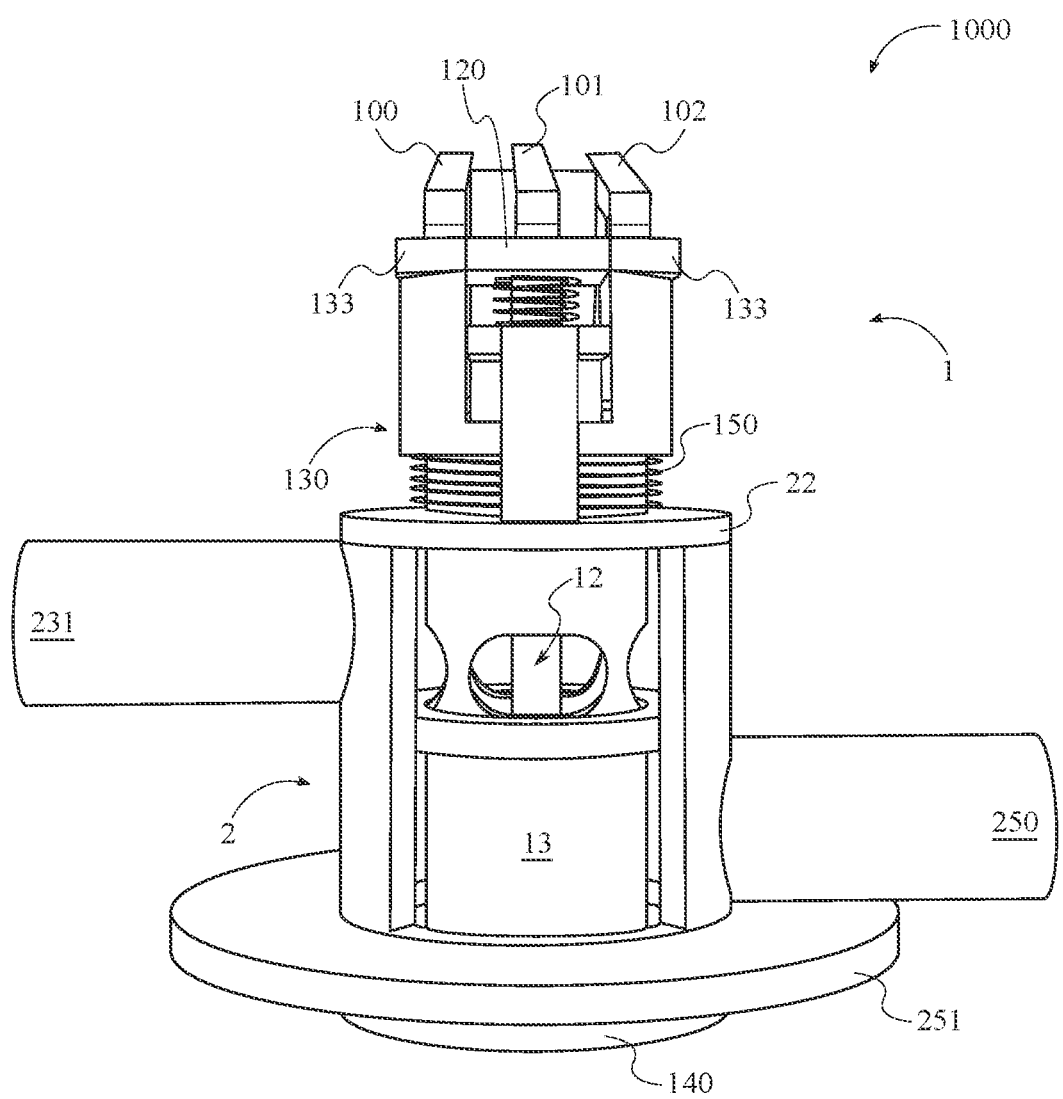
FIG. 19 is a front elevated view of the present invention with the exterior valve in the open configuration.
Figure 20:
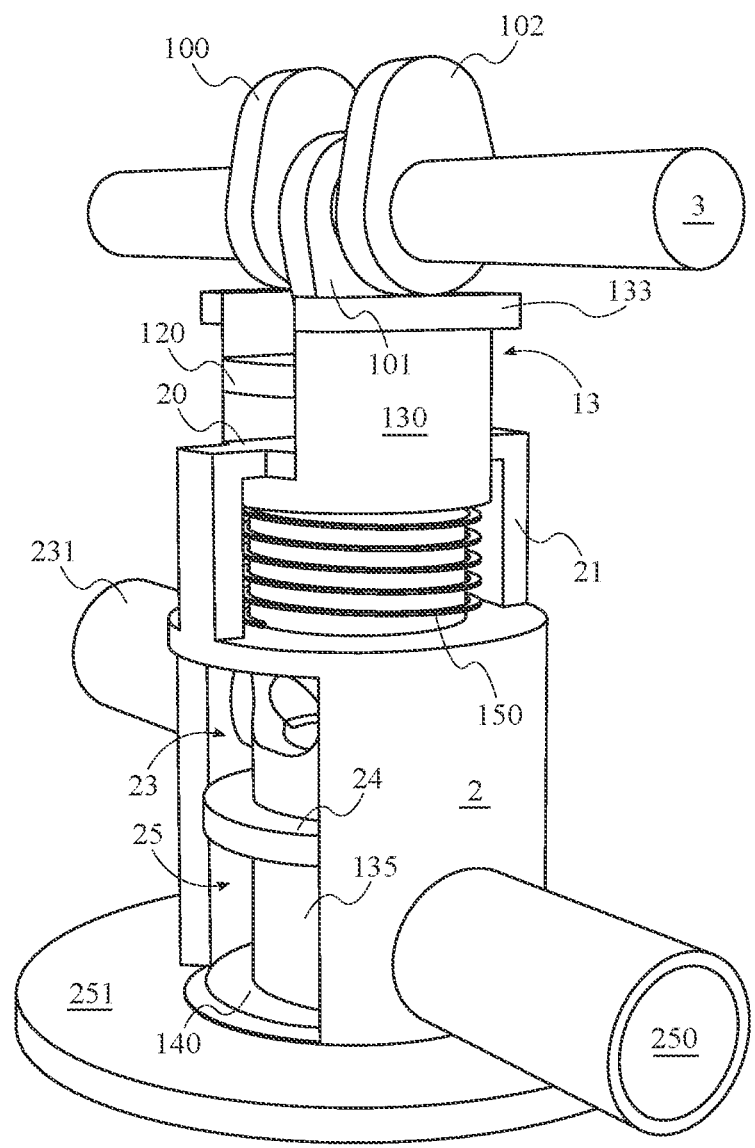
FIG. 20 is a right perspective view of the present invention.

As shown in FIG. 18, FIG. 19, and FIG. 20, when the present invention is in the exhaust configuration, the bevel 124 of the bottom plate 123 of the interior valve 12 engages with the inner diameter bevel 145 of the lower portion 140 of the exterior valve 13, thus sealing the recess cavity 201 of the lower portion 140 of the exterior valve 13 while both the interior valve 12 and exterior valve 13 are lowered the same distance simultaneously, thus exposing the recess 252 of the housing 2 and the beveled edge 253 of the housing 2. In the preferred embodiment of the present invention, after the fluid, the gas, or the combination of fluid and gas has been spent, the exterior valve 13 and the exterior valve 13 will lower, thus putting the present invention in the exhaust configuration. Once the present invention is in the exhaust configuration, the fluid, the gas, or the combination of fluid and gas that has been spent will enter into the exhaust chamber 25 through the recess 252 of the housing 2, then exit the system through the exhaust port 250. The intake port 231 and the exhaust port 250 are merely naming conventions and may be used interchangeably.

Figure 21:
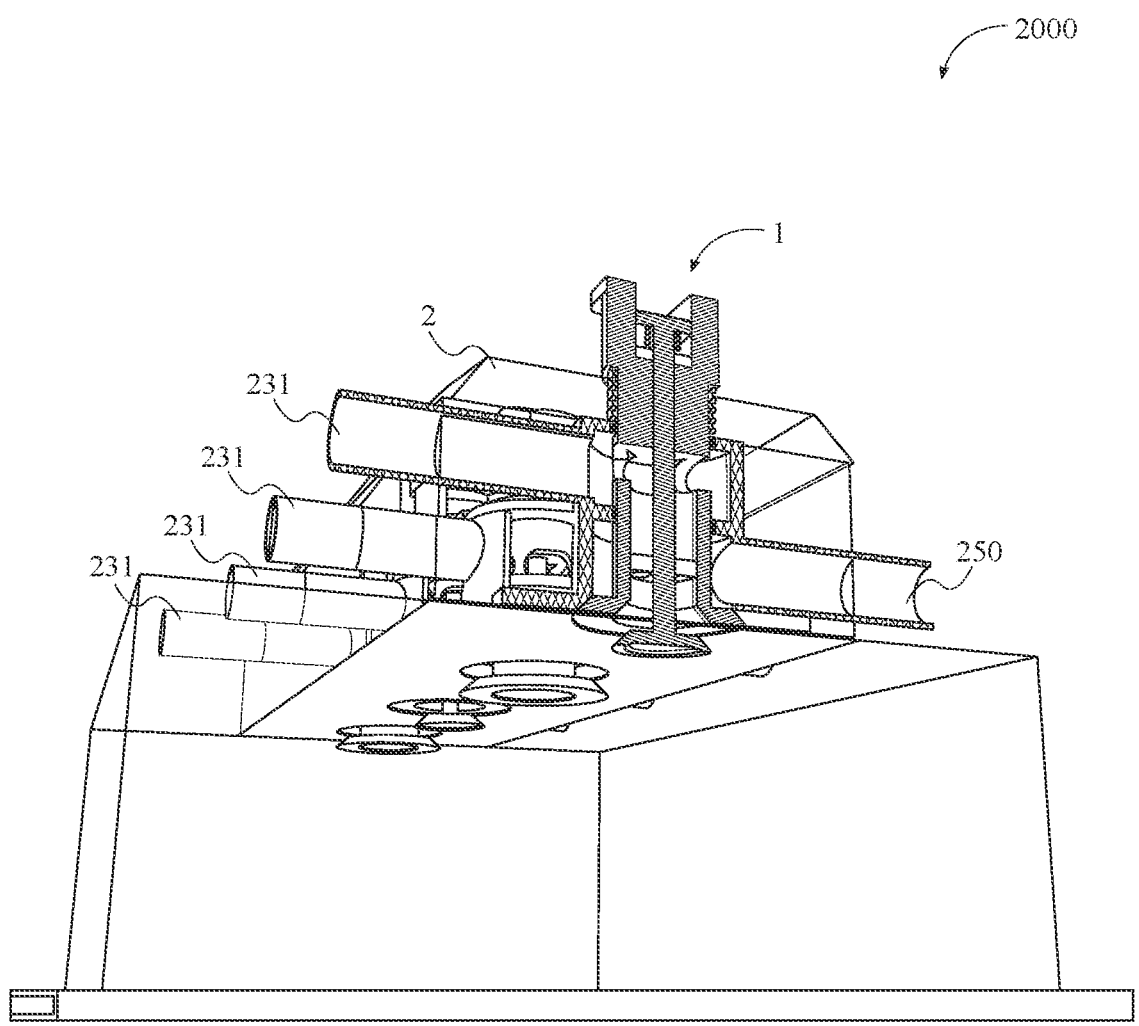
FIG. 21 is an alternative perspective view of an engine block incorporating a sectional view of the present invention.
Figure 22:
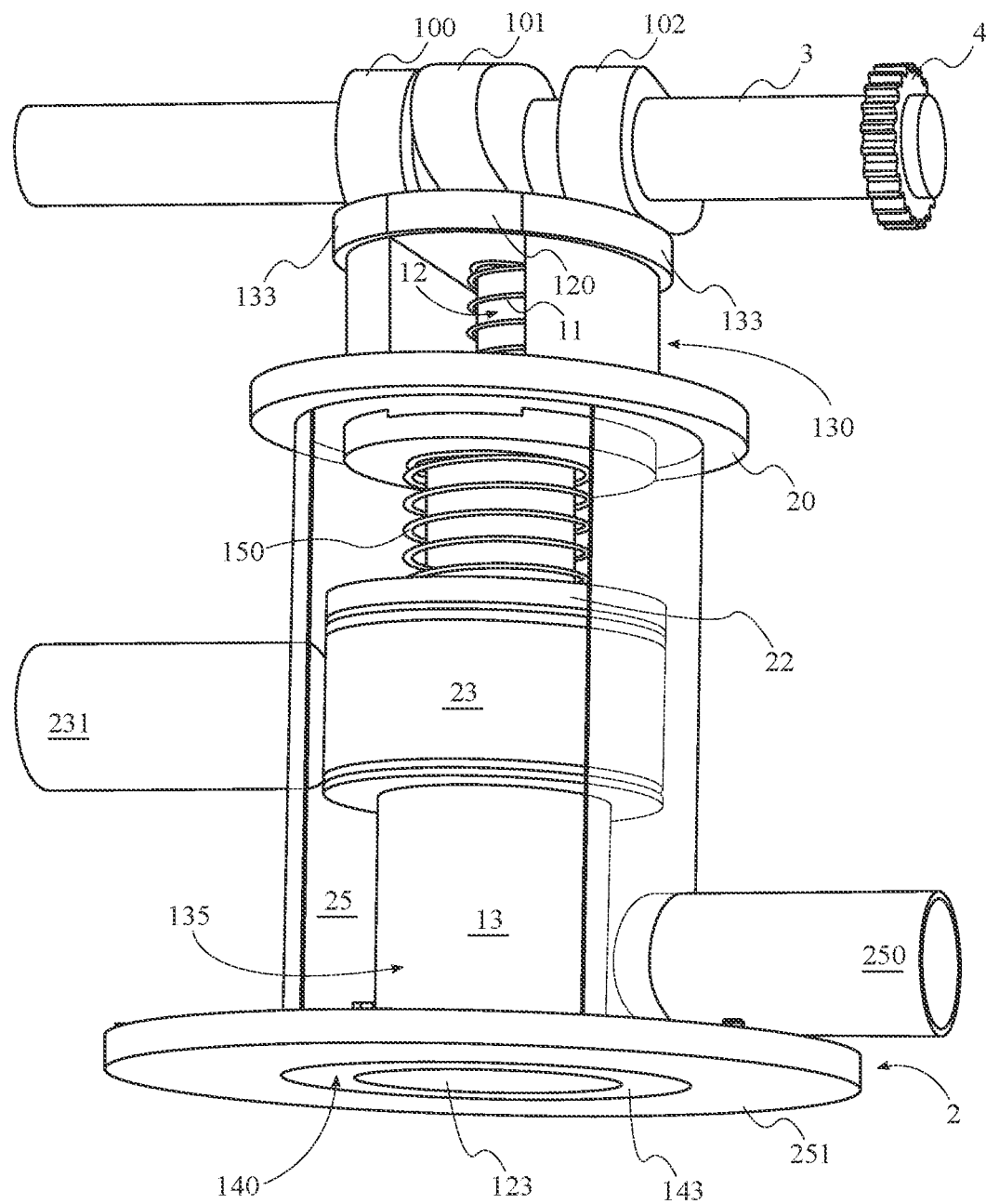
FIG. 22 is a bottom perspective view of an alternative embodiment of the present invention.
Figure 23:
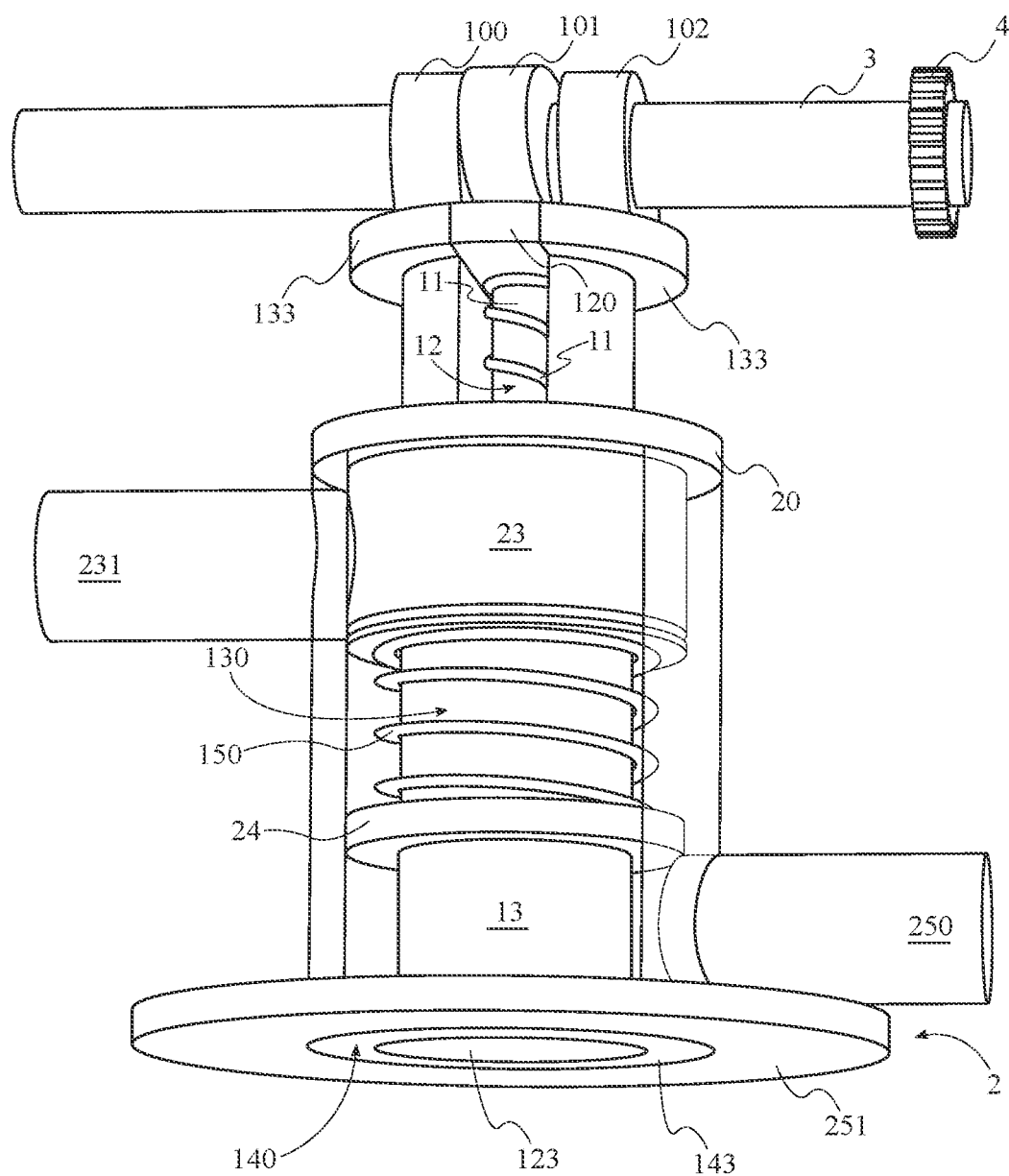
FIG. 23 is a bottom perspective view of an additional alternative embodiment of the present invention.
Figure 24:
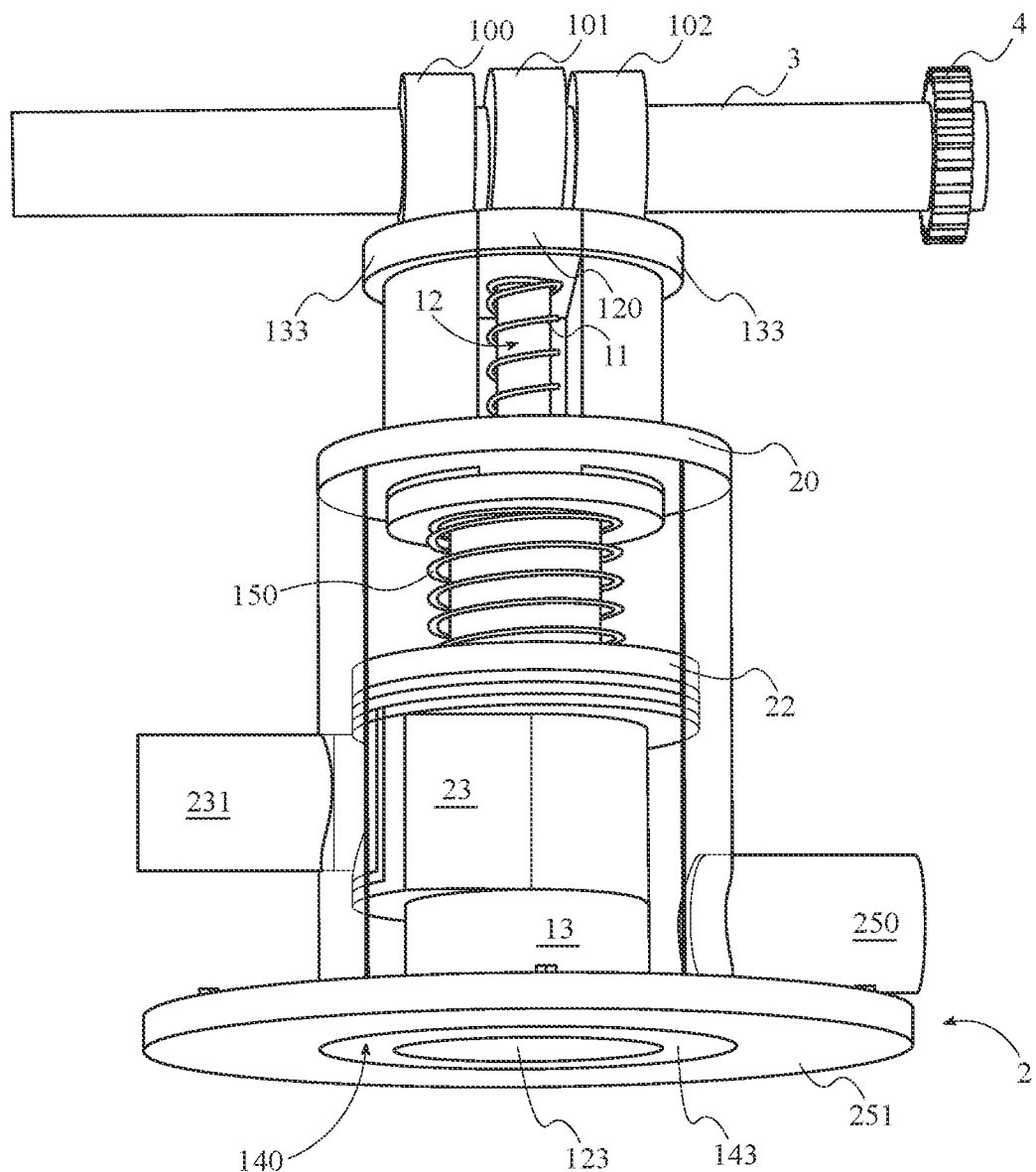
FIG. 24 is a bottom perspective view of an additional alternative embodiment of the present invention.
Figure 25:
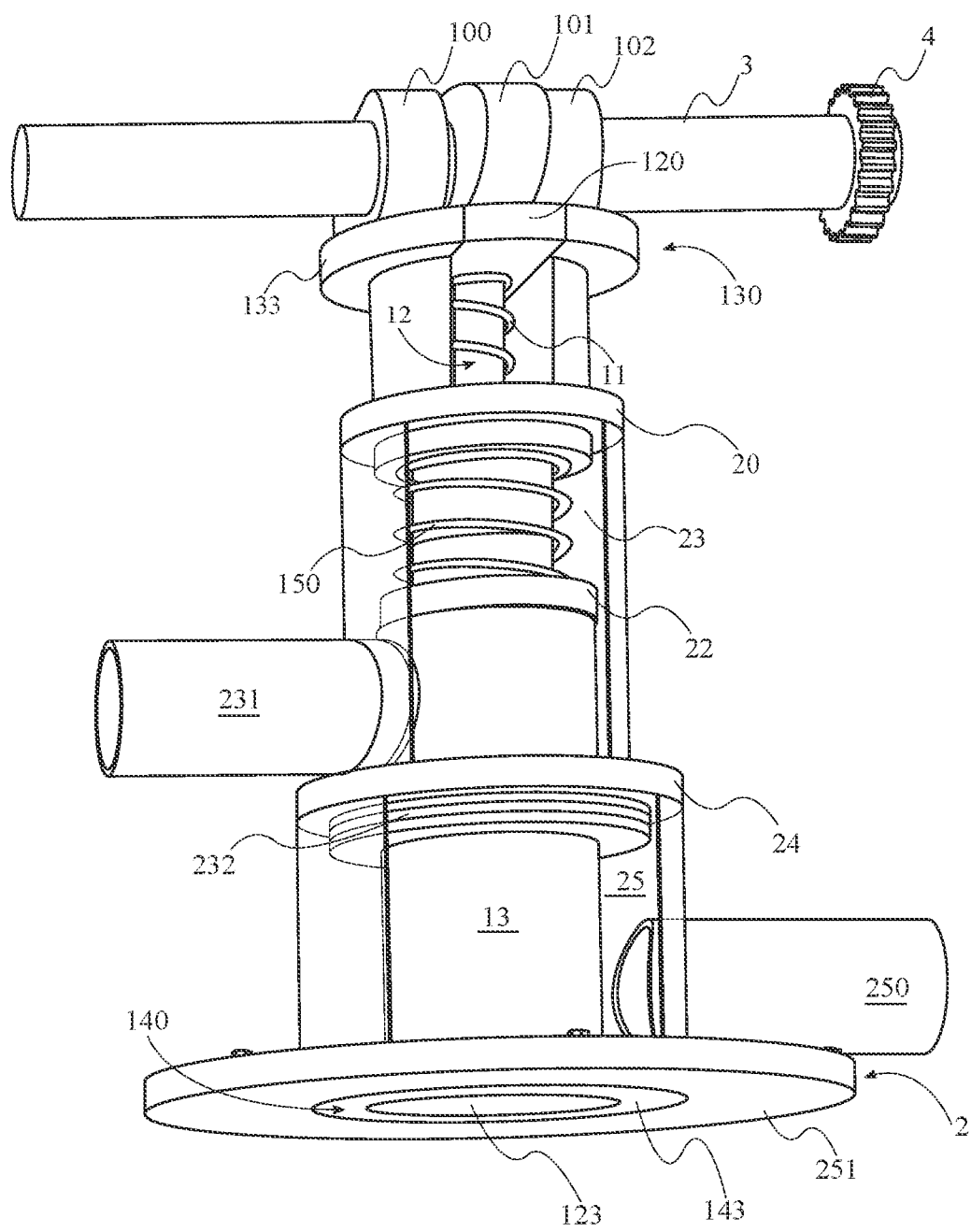
FIG. 25 is a bottom perspective view of an additional alternative embodiment of the present invention.
Figure 26:
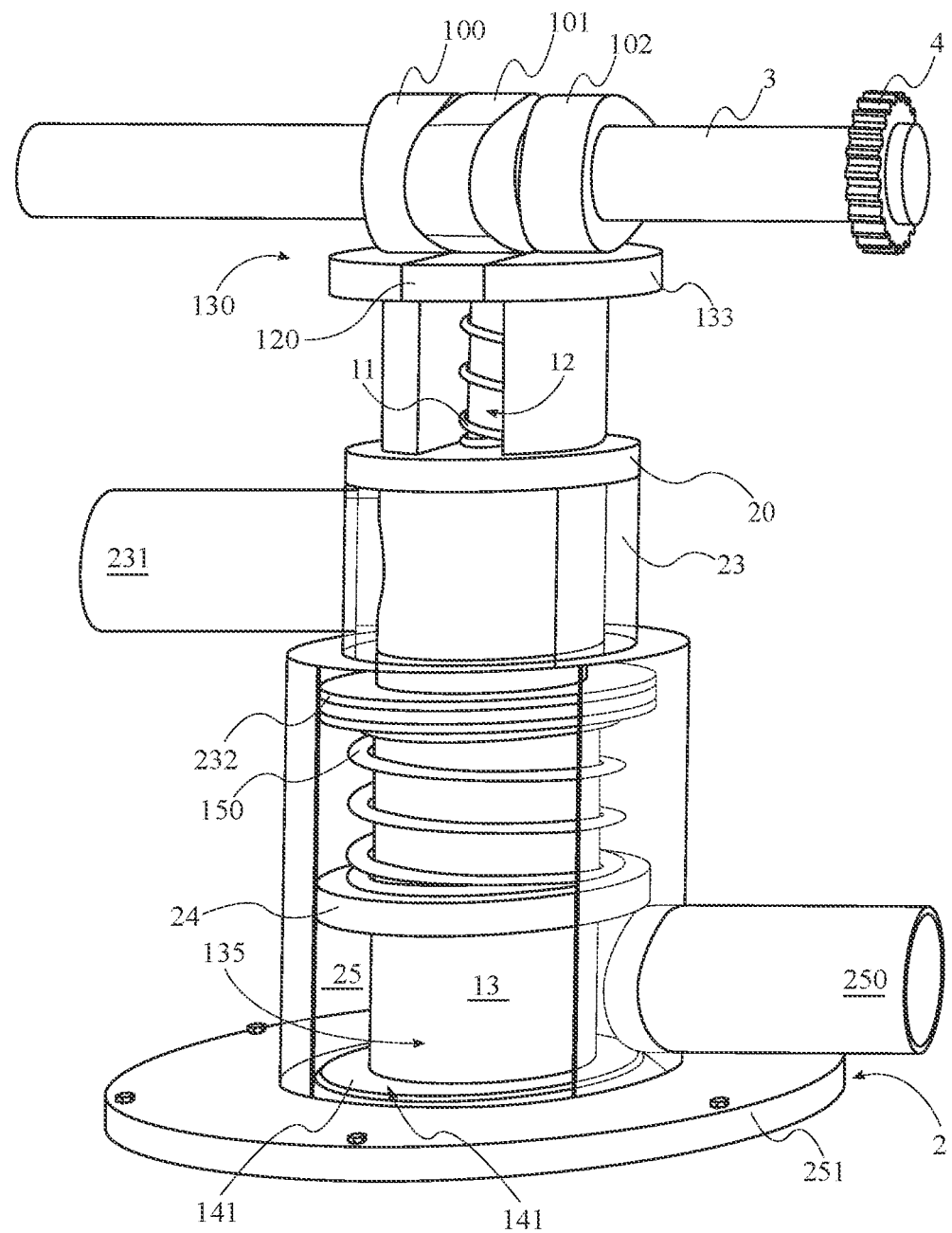
FIG. 26 is a top elevated perspective view of an additional alternative embodiment of the present invention.
Figure 27:
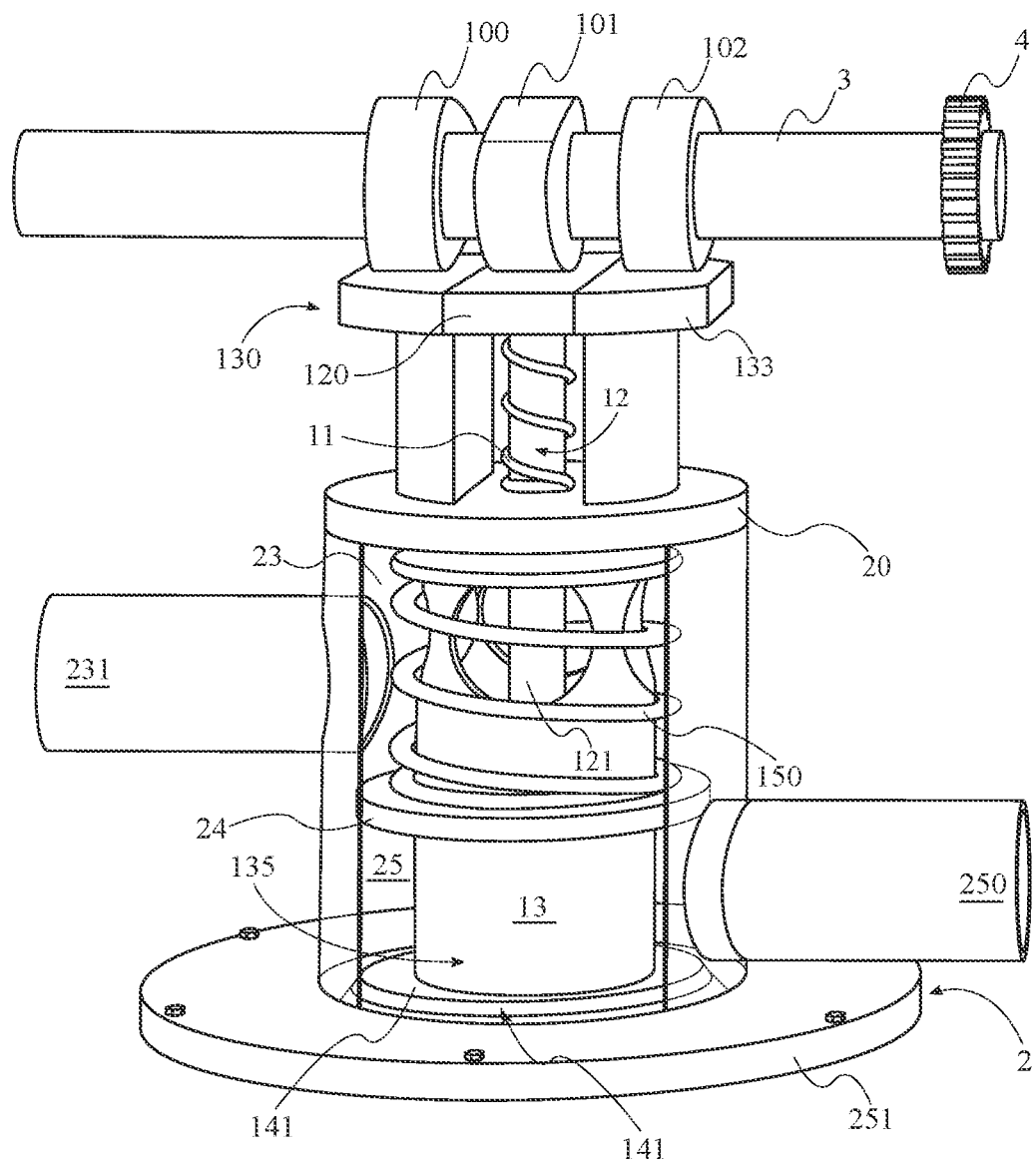
FIG. 27 is a top elevated perspective view of an additional alternative embodiment of the present invention.
Figure 28:
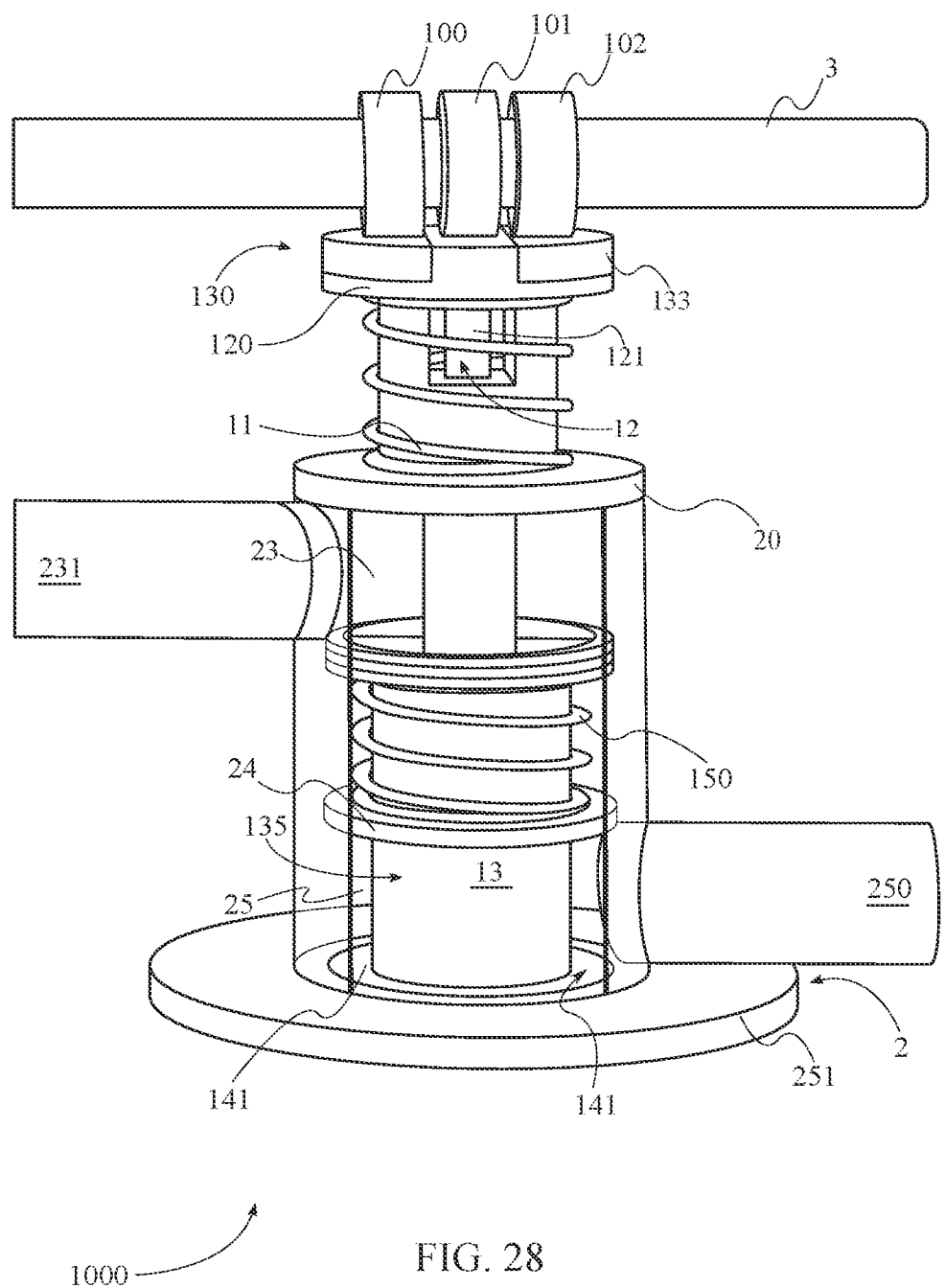
FIG. 28 is a top elevated perspective view of an additional alternative embodiment of the present invention.
Figure 29:
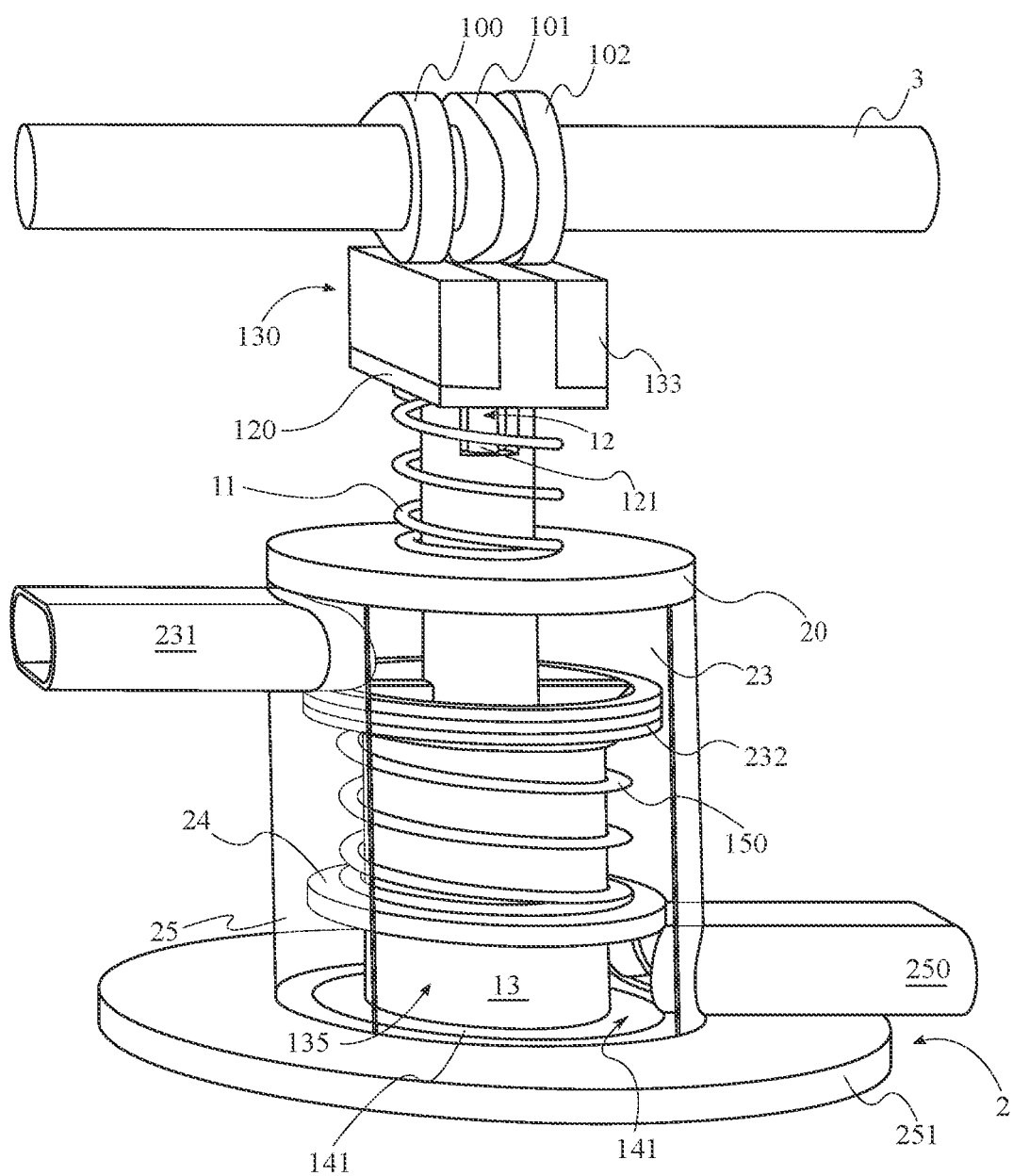
FIG. 29 is a top elevated perspective view of an additional alternative embodiment of the present invention.

In an additional embodiment of the preferred invention, the system can be used in a four-stroke internal combustion engine, as shown in FIG. 21. In the preferred embodiment, the plurality of valves within the engine housing 2 may each be at a unique phase of the internal combustion engine four-stroke process.

Figure 30:
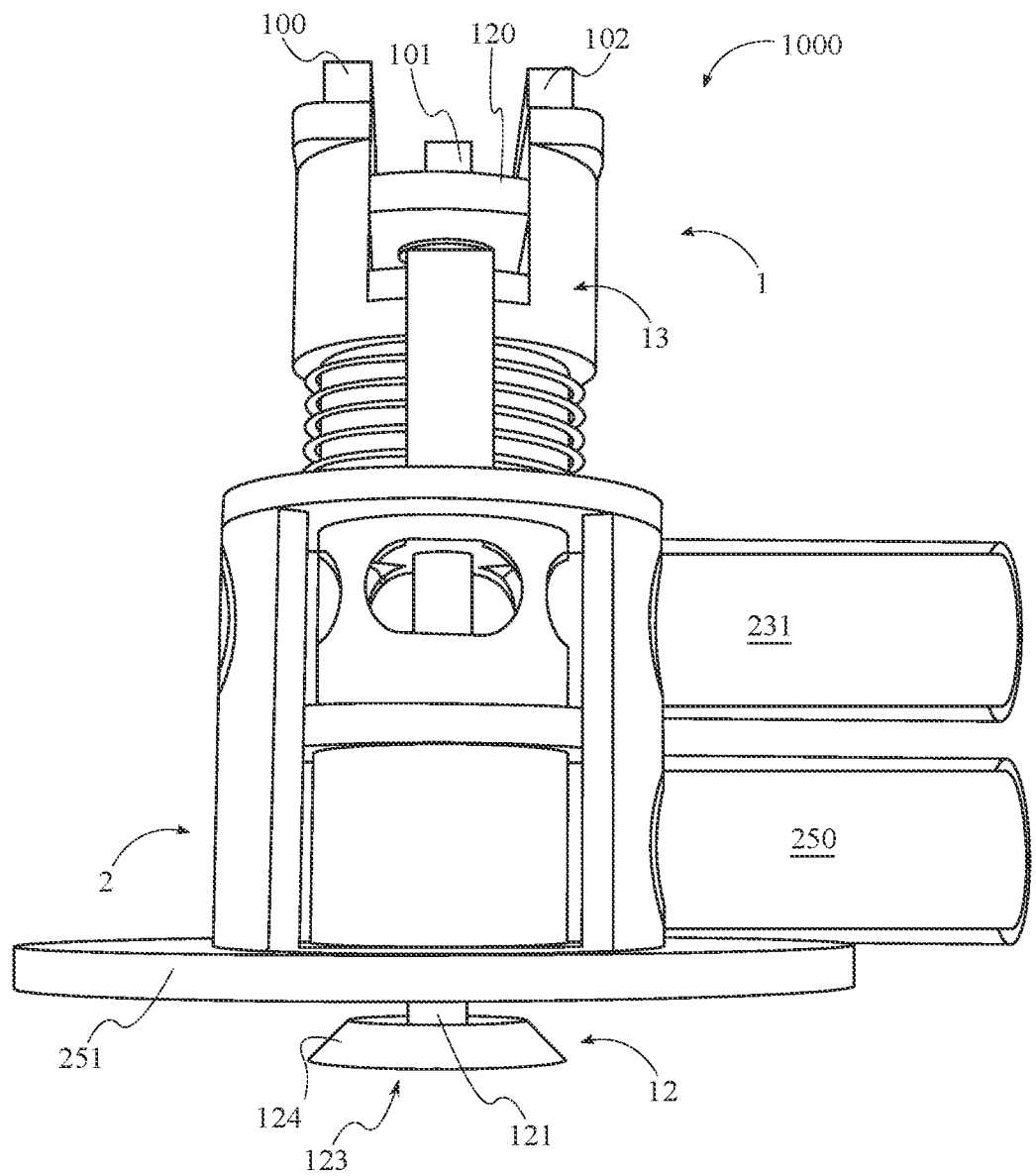
FIG. 30 is a front view of an additional alternative embodiment of the present invention with the interior valve in the open configuration.

As shown in FIGS. 22, 23, 24, 25, 26, 27, 28, 29, and 30, additional embodiments of the present invention may comprise different dimensions and configurations of the various components of the present invention. As shown in FIG. 30, one embodiment of the present invention comprises an intake port 231 and an exhaust port 250 that are diametrically aligned. In the case if the present invention, diametrically aligned, unlike diametrically opposed, is defined as the alignment of two objects along a singular point of a diameter. Moreover, in the case of the present invention, "diametrically aligned" refers to two objects sharing a common, vertically configured plane wherein said plane further intersects a diameter of a circle, wherein the case of the present invention, said circle is the cross-sectional area of the valves and adjacent housing 2. This alternate embodiment is advantageous because it allows for a reduction of occupied volume in the system as the intake port 231 and the exhaust port 250 are on the same side. The aforementioned configuration thus allows for heat transfer to occur between the intake port 231 and the exhaust port 250.

Figure 31:
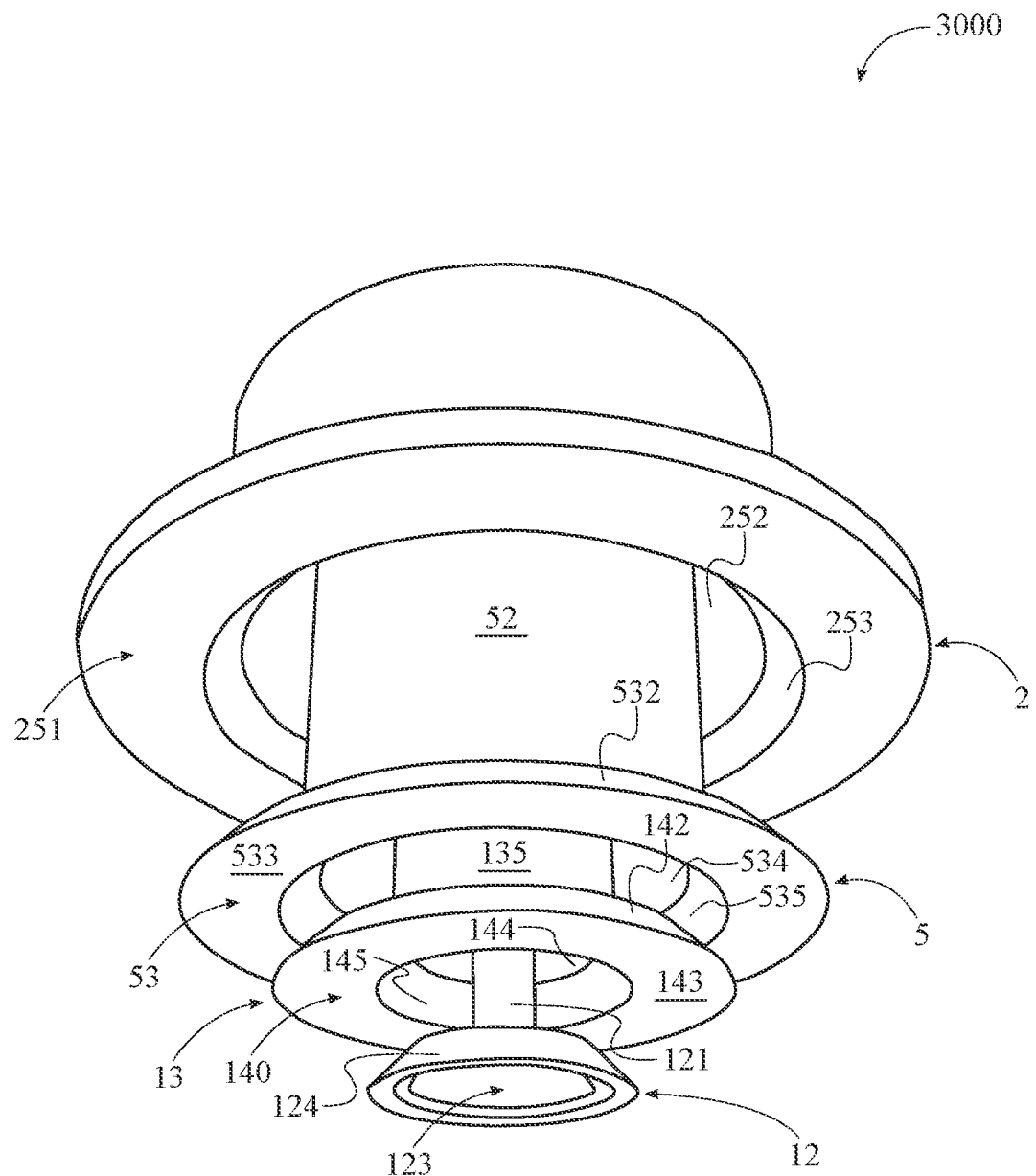
FIG. 31 is a bottom perspective view of an alternative embodiment of the present invention having a tertiary valve.

In some embodiments of the present invention, as shown in FIG. 31, the present invention may comprise a tertiary valve 5 wherein said tertiary valve 5 is interposed between the exhaust valve 13 and the housing 2. In the embodiment 3000 wherein the present invention comprises a tertiary valve 5, said tertiary valve 5 comprises an upper portion 50, a center portion 53, and a lower portion 53. In the aforementioned embodiment 3000, the upper portion 50 of the tertiary valve 5 is adjacent to the center portion 53 of the tertiary valve 5 and the lower portion 53 of the tertiary valve 5 is adjacent to the center portion 53 of the tertiary valve 5 wherein the lower portion 53 of the tertiary valve 5 and the upper portion 50 of the tertiary valve 5 are opposite of each other by separation of the center portion 53 of the tertiary valve 5.

In the embodiments of the present invention wherein the tertiary valve 5 is present, the upper portion 50 of the tertiary valve 5 comprises an upper face 501, a cutout 502, and a lip 503. The upper face 501 of the tertiary valve 5 is the topmost upwardly facing surface of the tertiary valve 5. The cutout 502 is a removed portion of the upper portion 50 of the tertiary valve 5 wherein the exterior valve 13 and the interior valve 12 may be housed.

The tertiary valve 5 may further comprise a through hole 51 wherein the exterior valve 13 may translate laterally throughout, as is the case of interior valve 12 within the exterior valve 13. The tertiary valve 5 comprises a duct 521 wherein said duct 521 is a void wherein a fluid may move throughout.

The lower portion 53 of the tertiary valve 5 comprises a top face 531 of the lower portion 53 of the tertiary valve 5, an outer diameter bevel 532 of the lower portion 53 of the tertiary valve 5, a bottom face 533 of the lower portion 53 of the tertiary valve 5, a recess cavity 534, and an inner diameter bevel 535 of the lower portion 53 of the tertiary valve 5. In the preferred embodiment 3000 of the present invention wherein the present invention comprises the tertiary valve 5, the diameter along the edge of the top face 531 of the lower portion 53 of the tertiary valve 5 is greater than the diameter of the center portion 52 of the tertiary valve 5. In the preferred embodiment 3000 of the present invention wherein the tertiary valve 5 is present, the diameter along the edge of the bottom face 533 of the lower portion 53 of the tertiary valve 5 is greater than the diameter along the edge of the top face 531 of the lower portion 53 of the tertiary valve 5. The top face 531 of the lower portion 53 of the tertiary valve 5 is adjacent to the outer diameter bevel 532. The outer diameter bevel 532 of the lower portion 53 of the tertiary valve 5 is adjacent to the bottom face 533 of the lower portion 53 of the tertiary valve 5.

In the preferred embodiment 3000 of the present invention wherein the present invention comprises the tertiary valve 5, the inner diameter bevel 535 of the tertiary valve 5 engages the outer diameter bevel 142 of the exterior valve 13 when in a configuration wherein the exterior valve 13 is seated within the tertiary valve 5. Further, it need be noted that in terms of the present invention, the number of valves that are interposed coaxially shall not be limited to three and in some embodiments, more valves may be used.

Furthermore, in the preferred embodiment of the present invention, the movement of cams, and thus the lateral movement of the internal valve and the exterior valve 13 may be actuated by a means for producing translative movement of the valves 4. In the preferred embodiment of the present invention, the means of producing translative movement of the valves 4 includes an actuator, a motor, a gear system, and the like.

The present invention may be manufactured in various ways including CNC machining, casting, 3D printing, and other methods of manufacturing known to those in the art. Additionally, the present invention may be manufactured out of a material such as high-density plastics, acetal resins, metals, metal alloys, and materials of the like known to those in the art.

Although the invention has been explained in relation to its preferred embodiment, it is to be understood that many other possible modifications and variations can be made without departing from the spirit and scope of the invention.

What is claimed is:

1. A coaxial valve system comprising an interior valve and an exterior valve wherein;
    the interior valve comprises an elongated shape having a central axis;
    the exterior valve comprises an elongated shape having a central axis;
    the central axis of the interior valve and the central axis of the exterior valve comprising a coaxial alignment wherein the interior valve interposes within the exterior valve; and
    the interior valve and the exterior valve have the capability to linearly move independently along the coaxial axes,
    wherein the interior valve comprises a rod, a top plate integrally connected to one end of the rod,
    wherein the exterior valve comprises a through hole proximate the central axis through which the rod of the interior valve transverses a length of a central portion of the exterior valve,
    wherein a cutout in an upper portion of the exterior valve is configured to limit movement of the interior valve to a movement along the central axis of the interior valve and, together with the top plate, to prevent rotation of the interior valve within the exterior valve.

2. The coaxial valve system as claimed in claim 1, wherein the exterior valve comprises:
    an upper portion;
    and
    a lower portion;
    the upper portion is adjacent to the center portion;
    the center portion is adjacent to the lower portion wherein the upper portion and the lower portion are opposite to each other by separation by the center portion.

3. The coaxial valve system as claimed in claim 2, wherein the interior valve also comprises:
    a bottom plate connected to an opposite end of the rod.

4. The coaxial valve system as claimed in claim 2 wherein the top plate of the interior valve engaging with the upper portion of the exterior valve;
    and
    the bottom plate of the interior valve engaging with the lower portion of the exterior valve.

5. The coaxial valve system as claimed in claim 1 further comprising an interior valve spring wherein said spring is circumferentially positioned around the rod of the interior valve.

6. The coaxial valve system as claimed in claim 5 further comprises an exterior valve spring wherein said spring is circumferentially positioned around the central portion of the exterior valve.

7. The coaxial valve system as claimed in claim 1 wherein an upper portion of the exterior valve comprises:
    an upper face;
    a cutout; and
    a lip;
    the upper face being the topmost upwardly facing surface of the exterior valve;
    and
    the lip proximate an uppermost portion of the upper portion of the exterior valve.

8. The coaxial valve system as claimed in claim 7 wherein the center portion of the exterior valve comprises:
    a duct;
    an internal valve guide rail; and
    a plurality of openings;
    the duct providing a cavity within the center portion of the exterior valve wherein the duct provides a section of the exterior valve that is separated from the interior valve;
    the internal valve guide rail located within the central portion of the exterior valve comprising the through hole wherein the rod of the interior valve transverses.

9. The coaxial valve system as claimed in claim 8 wherein the internal valve guide rail comprises a plurality of bore holes.

10. The coaxial valve system as claimed in claim 9 wherein the lower portion of the exterior valve comprises:
    a top face;
    an outer diameter bevel;
    a bottom face; and
    a recess cavity;
    the top face of the lower portion of the exterior valve being the upwardly facing surface;
    the bottom face is a downwardly facing surface opposite the top face;
    the outer diameter bevel proximate the outermost edges of the top face and the bottom face wherein the bevel edge is an angled surface;
    the recess cavity providing an enlarged opening within the bottom face of the exterior valve connecting to the duct.

11. The coaxial valve system as claimed in claim 10 wherein the bottom plate of the interior valve comprises a bevel and the recess cavity of the lower portion of the exterior valve comprises an inner diameter bevel;
    the bevel of the bottom plate engaging with the inner diameter bevel of the lower portion.

12. The coaxial valve system as claimed in claim 11 wherein the system is contained within a housing.

13. The coaxial valve system as claimed in claim 12 wherein the housing comprises an intake chamber and an exhaust chamber
    the intake chamber is a cavity within the housing; and
    the exhaust chamber is a cavity within the housing.

14. The coaxial valve system as claimed in claim 13 wherein the housing further comprises an intake port and an exhaust port wherein the intake port is an open passageway to the intake chamber and the exhaust port is an open passageway to the exhaust chamber.

15. A coaxial valve system comprising an interior valve and an exterior valve wherein;
- the interior valve comprises an elongated shape having a central axis;
- the exterior valve comprises an elongated shape having a central axis;
- the central axis of the interior valve and the central axis of the exterior valve comprising a coaxial alignment wherein the interior valve is interposing within the exterior valve;
- the interior valve and the exterior valve have the capability to linearly move independently along the coaxial axes; and
- the interior valve and the exterior valve being linearly actuated by a plurality of cams coupled to a camshaft,
- wherein the interior valve comprises a rod, a top plate integrally connected to one end of the rod,
- wherein a cutout in an upper portion of the exterior valve is configured to limit movement of the interior valve to a movement along the central axis of the interior valve and, together with the top plate, to prevent rotation of the interior valve within the exterior valve.

16. The coaxial valve system as claimed in claim 15, wherein the exterior valve comprises:
- an upper portion;
- a lower portion; and
- a through hole;
- the upper portion is adjacent to the center portion;
- the center portion is adjacent to the lower portion wherein the upper portion and the lower portion are opposite to each other, separated by the center portion;
- the center portion comprising a duct and a plurality of openings;
- the duct is a cavity located within the center portion of the exterior valve;
- the plurality of openings traverse through the exterior valve; and
- the through hole extending the length of the exterior valve proximate the central axis.

17. The coaxial valve system as claimed in claim 16 wherein said system is contained within a housing comprising:
- an intake chamber;
- an exhaust chamber;
- an intake port; and
- an exhaust port;
- the intake chamber being a cavity within the housing wherein the intake port is an open channel extending outwardly from the intake chamber; and
- the exhaust chamber being a cavity within the housing wherein the exhaust port is open channel extending outwardly from the exhaust chamber.

18. A coaxial valve system comprising an interior valve, an exterior valve, and a housing;
- the interior valve comprises an elongated shape having a central axis;
- the exterior valve comprises an elongated shape having a central axis;
- the central axis of the interior valve and the central axis of the exterior valve comprising a coaxial alignment wherein the interior valve is interposing within the exterior valve; and
- the interior valve and the exterior valve have the capability to linearly move independently along the coaxial axes;
- the exterior valve and the interior valve being contained within the housing,
- wherein the interior valve comprises a rod, a top plate integrally connected to one end of the rod and a bottom plate connected to an opposite end of the rod,
- wherein the exterior valve comprises a through hole proximate the central axis through which the rod of the interior valve transverses a length of a central portion of the exterior valve,
- wherein a cutout in an upper portion of the exterior valve is configured to limit movement of the interior valve to a movement along the central axis of the interior valve and, together with the top plate, to prevent rotation of the interior valve within the exterior valve.

19. The coaxial valve system as claimed in claim 18 wherein the housing comprises:
- an intake chamber;
- an exhaust chamber;
- an intake port; and
- an exhaust port;
- the intake chamber being a cavity within the housing wherein the intake port is an open channel extending outwardly from the intake chamber; and
- the exhaust chamber being a cavity within the housing wherein the exhaust port is open channel extending outwardly from the exhaust chamber.

\* \* \* \* \*